(12) United States Patent
Izumi

(10) Patent No.: US 8,599,492 B2
(45) Date of Patent: Dec. 3, 2013

(54) ZOOM LENS

(75) Inventor: Ryotaro Izumi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 105 days.

(21) Appl. No.: 13/269,298

(22) Filed: Oct. 7, 2011

(65) Prior Publication Data

US 2012/0087018 A1   Apr. 12, 2012

(30) Foreign Application Priority Data

Oct. 12, 2010  (JP) .................................. 2010-229388

(51) Int. Cl.
  *G02B 15/00*  (2006.01)
  *G02B 15/15*  (2006.01)

(52) U.S. Cl.
  CPC .............. G02B 15/00 (2013.01); *G02B 15/155* (2013.01)
  USPC ............................ 359/687; 359/686; 359/745

(58) Field of Classification Search
  USPC .......... 359/687, 695, 686, 696, 745, 746, 747
  See application file for complete search history.

(56) References Cited

U.S. PATENT DOCUMENTS 7,106,521 B2 * 9/2006 Hoshi ........................... 359/687
2010/0277811 A1 * 11/2010 Kim ............................. 359/687

FOREIGN PATENT DOCUMENTS

| JP | 2005-164905 | 6/2005 |
| JP | 2008-309993 | 12/2008 |
| JP | 2009-25366 | 2/2009 |
| JP | 2010-134108 | 6/2010 |

* cited by examiner

*Primary Examiner* — Scott J Sugarman
*Assistant Examiner* — William Alexander
(74) *Attorney, Agent, or Firm* — Finnegan, Henderson, Farabow, Garrett & Dunner, L.L.P.

(57) ABSTRACT

There is provided a zoom lens which is suitable for a digital still camera and a video camera and includes a small number of lenses, especially a zoom lens which has an angle of view of 75° or more at the wide-angle end and a variable power ratio of about ×10. The zoom lens includes a first lens group with positive refractive power, a second lens group with negative refractive power, a third lens group with positive refractive power, and, a fourth lens group with positive refractive power. The zoom lens varies power by changing an interval of each neighboring lens groups. The first lens group is composed of a negative lens and a positive lens. The third lens group is composed of an aperture stop, a cemented lens formed by a positive lens in a biconvex shape and a negative lens, and a positive lens.

30 Claims, 18 Drawing Sheets

ZOOM LENS

This application is based on Japanese Patent Application No. 2010-229388 filed on Oct. 12, 2010, in Japanese Patent Office, the entire content of which is hereby incorporated by reference.

TECHNICAL FIELD

The present invention relates to a compact zoom lens which is suitable to a device such as a digital still camera and a video camera each employing a CCD (Charge Coupled Device) or CMOS (Complementary Metal Oxide Semiconductor) and which has a variable power ratio of about ×10 and a wide angle of view.

BACKGROUND

In recent years, efforts to provide highly integrated and downsized image pickup elements such as a CCD and CMOS have been made. Corresponding to that, an image pickup device such as a digital still camera and a video camera each employing a device such as a CCD and CMOS is required to exhibit higher performance and to be downsized as the entire device.

With the popularization of digital still cameras, digital still cameras have been used at various situations. As the result, efforts to enhance the portability of digital cameras, namely efforts to reduce their size and weight have been made.

In digital still cameras, achieving higher variable power and wider angle of view increases the degree of freedom of shooting. For example, it enables to shoot a subject from a position closer than ever to the subject and enables to shoot a wide area even under the situation that the position of the subject is close to the operator such as indoor shooting, which are advantageous.

As a compact and high-variable-power zoom lens which is suitable for a digital still camera and a video camera, four-group zoom lenses are known (for example, JP-A Nos. 2005-164905, 2008-309993, 2009-025366, and 2010-134108), wherein the zoom lens is composed of leans groups having positive, negative, positive and positive refractive power in this order from the object side and an interval of each neighboring lens groups are changed for varying the power.

However, in the zoom lens disclosed in JP-A No. 2005-164905, the function of varying power is mainly acted by the third lens group and the third lens group is required to be moved greatly in order to realize high variable power, which enlarges the whole optical system in length. Thereby, the diameter of the forefront lens becomes large and it brings enlarged size of a device.

Though JP-A No. 2008-309993 provides a simple lens construction, the angle of view at the wide-angle end is as small as 50° to 60° and the variable power ratio is as small as about ×4.7. Further, since the first lens group is moved greatly for varying power from the wide-angle end to the telephoto end, the length of the whole lens system becomes long and it brings enlarged size of a device.

Though JP-A No. 2009-025366 realizes an optical system with excellent optical performance wherein the variable power ratio is about ×10, the angle of view at the wide-angle end is as small as about 60°. The optical system has a large number of lenses in order to obtain high variable power ratio and excellent optical performance, which increases the cost.

JP-A No. 2010-134108 provides an optical system with a variable power ratio of about ×10 and an angle of view at the wide-angle end of about 80°. However, a stop is moved in the optical system, which increases the number of movable parts in the optical system. Therefore, a mechanism for moving a movable group is required and it brings enlarged size of a device.

SUMMARY

The present invention has been achieved in view of the above problems, and is intended to provide a zoom lens which is suitable for a digital still camera and a video camera and includes a small number of lenses, especially to provide a zoom lens which has an angle of view of 75° or more at the wide-angle end and a variable power ratio of about ×10.

The above problems will be solved by the following structures.

An embodiment of the present invention is a zoom lens comprising, in order from an object side: a first lens group with positive refractive power, a second lens group with negative refractive power; a third lens group with positive refractive power; and a fourth lens group with positive refractive power, wherein the zoom lens varies power by changing an interval of each neighboring lens groups, the first lens group consists of, in order from the object side, a negative lens and a positive lens, and the third lens group comprises, in order from the object side, an aperture stop, a cemented lens formed by a positive lens in a biconvex shape and a negative lens, and a positive lens.

Another embodiment is a zoom lens comprising, in order from an object side: a first lens group with positive refractive power; a second lens group with negative refractive power, a third lens group with positive refractive power; and a fourth lens group with positive refractive power, wherein the zoom lens varies power by changing an interval of each neighboring lens groups, the third lens group comprises, in order from the object side, an aperture stop, a cemented lens formed by a positive lens and a negative lens, and a positive lens, and the zoom lens satisfies a conditional expression relating to a lateral magnification at a telephoto end of the second lens group, a lateral magnification at a wide-angle and of the second lens group, a lateral magnification at a telephoto end of the third lens group, and a lateral magnification at a wide-angle end of the third lens group.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENTS

Figure 1A:
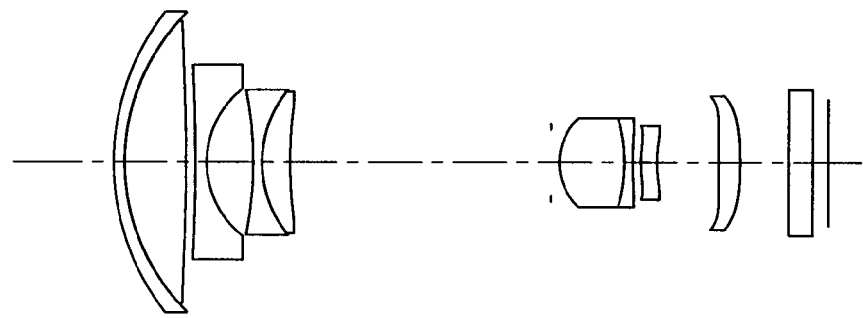
FIGS. 1A, 1B and 1C show sectional views of the zoom lens of Example 1.

Preferred embodiments of the present invention will be described below.

There is provided a zoom lens comprising, in order from an object side: a first lens group with positive refractive power, a second lens group with negative refractive power; a third lens group with positive refractive power; and a fourth lens group with positive refractive power. The zoom lens varies power by changing an interval of each neighboring lens groups. The first lens group consists of, in order from the object side, a negative lens and a positive lens. The third lens group comprises, in order from the object side, an aperture stop, a cemented lens formed by a positive lens in a biconvex shape and a negative lens, and a positive lens.

The above zoom lens exhibits high variable power of ×10 or more and excellent optical performance, by composing the whole lens system of from the object side, a first lens group with positive refractive power, a second lens group with negative refractive power, a third lens group with positive refractive power, and a fourth lens group with positive refractive power. Further, by moving each lens group along the optical axis such that an air distance between each neighboring lens groups is changed to vary the power and correct a change of the focal position, a degree of freedom of aberration correction increases and downsizing of both of the total length of the zoom lens and the diameter of the forefront lens can be achieved.

By providing the first lens consisting of in order Gout the object side, a negative lens and a positive lens, longitudinal chromatic aberration and magnification chromatic aberration can be corrected sufficiently. In comparison with a structure that the first lens group is composed of three lenses of one negative lens and two positive lenses, the first lens can be downsized in thickness and an off-axis light flux passes at a much lower position. Therefore, the size of the forefront lens can be reduced. Further, by forming the first lens group into a two-element structure formed of a negative lens and a positive lens, the first lens group can be reduced in weight and a load applied to a drive mechanism under the power varying operation.

Further, by arranging an aperture stop, a cemented lens formed by a positive lens in a biconvex shape and a negative lens, and a positive lens, in the third lens in order from the object side, a position of the exit pupil can be positioned away from an image pickup element. Therefore, telecentricity which is required when the image pickup element is a CCD or CMOS can be ensured easily and the downsizing of the diameters of the forefront lens and the rearmost lens can be achieved. By arranging a cemented lens formed by a positive lens in a biconvex shape and a negative lens in the third lens group in this order from the object side, longitudinal chromatic aberration and spherical aberration can be controlled to be small. By arranging a positive lens at the image side of the cemented lens, coma and astigmatism caused in the third lens group can be controlled to be small.

Another embodiment of the present invention is a zoom lens comprising, in order from an object side: a first lens group with positive refractive power, a second lens group with negative refractive power, a third lens group with positive refractive power, and a fourth lens group with positive refractive power. The zoom lens varies power by changing an interval of each neighboring lens groups. The third lens group comprises, in order from the object side, an aperture stop, a cemented lens formed by a positive lens and a negative lens, and a positive lens, and the zoom lens satisfies the following conditional expression.

$$1.3 < (\beta 2t/\beta 2w)/(\beta 3t/\beta 3w) < 3.0 \tag{1}$$

In the expression, $\beta 2t$ is a lateral magnification at a telephoto end of the second lens group, $\beta 2w$ is a lateral magnification at a wide-angle end of the second lens group, $\beta 3t$ is a lateral magnification at a telephoto end of the third lens group, and $\beta 3w$ is a lateral magnification at a wide-angle end of the third lens group.

The above zoom lens exhibits high variable power of ×10 or more and excellent optical performance, by composing the whole lens system of from the object side, a first lens group with positive refractive power, a second lens group with negative refractive power, a third lens group with positive refractive power, and a fourth lens group with positive refractive power. Further, by moving each lens group along the optical axis such that an air distance between each neighboring lens groups is changed to vary the power and correct a change of the focal position, a degree of freedom of aberration correction increases and downsizing of both of the total length of the zoom lens and the diameter of the forefront lens can be achieved.

Further, by arranging an aperture stop, a cemented lens formed by a positive lens and a negative lens, and a positive lens, in the third lens in order from the object side, a position of the exit pupil can be positioned away from an image pickup element. Therefore, telecentricity which is required when the image pickup element is a CCD or CMOS can be ensured easily and the downsizing of the diameters of the forefront lens and the rearmost lens can be achieved. By arranging a cemented lens formed by a positive lens and a negative lens, and a positive lens, in the third lens group in this order from the object side, longitudinal chromatic aberration and spherical aberration can be controlled to be small. By arranging a positive lens at the image side of the cemented lens, coma and astigmatism caused in the third lens group can be controlled to be small.

When the value of the conditional expression (1) becomes lower than the upper limit, the ratio of the lateral magnifications at the telephoto end and the wide-angle end in the second lens group does not become excessively large. Therefore, it avoids the power of the second lens group from being large and avoids aberration fluctuation corresponding to assembling errors caused in an assembling process from being large. When the value of the conditional expression (1) exceeds the lower limit, the power of the third lens group does not become excessively large, which avoids error sensitivity of the third lens group from being large. On the other hand, by satisfying the conditional expression (1), the optical system is downsized and the mass-productively is enhanced.

In the above zoom lenses, it is preferable that the following expression is satisfied.

$$0.5 < |f2g|/f3g < 0.8 \quad (2)$$

In the expression, f2g is a composite focal length of the second lens group and f3g is a composite focal length of the third lens group.

By satisfying the conditional expression (2), the optical system is downsized and ensures excellent optical performance and its mass-productively is enhanced. When the value of the second conditional expression (2) becomes lower than the upper limit, the power of the second lens group does become excessively weak and the sufficient variable power can be ensured without enlarging the movement amount of the second lens group, which decreases the length of the whole optical system. When the value of the second conditional expression (2) exceeds the lower limit, the power of the second lens group does not become excessively large and aberrations such as coma, astigmatism, and field of curvature can be corrected sufficiently. Further, since the power does not become excessively large, the aberration fluctuation corresponding to error fluctuation can be controlled to be small. Thereby, an excellent optical performance can be ensured and its mass-productivity is enhanced.

In the above zoom lenses, it is preferable that the following conditional expression is satisfied.

$$0.55 < f3g/(fw \times ft)^{1/2} < 0.90 \quad (3)$$

In the conditional expression, f3g is a composite focal length of the third lens group, fw is a focal length of a whole system of the zoom lens at a wide-angle and ft is a focal length of a whole system of the zoom lens at a telephoto end.

By satisfying the conditional expression (3), the optical system is downsized and ensures excellent optical performance and its mass-productively is enhanced. When the value of the conditional expression (3) becomes lower than the upper limit, the power of the third lens group does not become excessively weak, and the sufficient variable power can be ensured without enlarging the movement amount of the third lens group, which decreases the length of the whole optical system. When the value of the conditional expression (3) exceeds the lower limit, the power of the third lens group does not become excessively strong and spherical aberration and coma can be controlled to be small. Further, aberration fluctuation corresponding to error fluctuation and shape errors becomes small, which enhances its mass-productivity.

In the above zoom lenses, it is preferable that the following conditional expression is satisfied.

$$0.3 < |f2g|/(fw \times ft)^{1/2} < 0.6 \quad (4)$$

In the conditional expression, f2g is a composite focal length of the second lens group, fw is a focal length of a whole system of the zoom lens at a wide-angle end and ft is a focal length of a whole system of the zoom lens at a telephoto end.

By satisfying the conditional expression (4), the optical system is downsized and its mass-productively is enhanced. When the value of the conditional expression (4) becomes below the upper limit, the power of the second lens group does not become excessively weak, and the sufficient variable power can be ensured without enlarging the movement amount of the second lens group, which decreases the length of the whole optical system. When the value of the conditional expression (4) exceeds the lower limit, the power of the second lens group does not become excessively strong and coma and curvature of field caused in the second lens group can be controlled to be small. Further, aberration fluctuation corresponding to error fluctuation and shape errors becomes small, which enhances its mass-productivity.

In the above zoom lenses, it is preferable that the following conditional expression is satisfied.

$$1.0 < f1g/(fw \times ft)^{1/2} < 4.0 \quad (5)$$

In the conditional expression, f1g is a composite focal length of the first lens group, fw is a focal length of a whole system of the zoom lens at a wide-angle end and ft is a focal length of a whole system of the zoom lens at a telephoto end.

By satisfying the conditional expression (5), the optical system is downsized and ensured excellent optical performance. When the value of the conditional expression (5) becomes lower than the upper limit, the power of the first lens group does not become excessively weak, which decreases the length of the whole optical system and the effective diameter. When the value of the conditional expression (5) exceeds the lower limit, the power of the first lens group does not become excessively strong, and off-axis aberrations such as coma mainly at the wide-angle end are easily corrected.

In the above zoom lenses, it is preferable that the third lens group includes, in order from the object side: a 3a-th lens group consisting of a cemented lens formed by a positive lens and a negative lens, and a 3b-th lens group being a positive lens, and the zoom lens satisfies the following conditional expression.

$$1.0 < f3gb/f3ga \quad (6)$$

In the conditional expression, f3ga is a composite focal length of the 3a-th lens group and f3gb is a composite focal length of the 3b-th lens group.

By satisfying the conditional expression (6), the optical system is downsized and ensures excellent optical performance. When the value of the conditional expression (6) exceeds the lower limit, the power of the 3b-th lens group does not become excessively strong, which avoids the position of the principal point from being arranged close to the image side. Thereby, an optical system formed of the first through third lens groups has a shorter back focal length, which downsizes the optical system.

In the above zoom lenses, it is preferable that the following conditional expression is satisfied.

$$25 < vd3ga1 - vd3ga2 < 45 \quad (7)$$

In the conditional expression, vd3ga1 is an Abbe number of the positive lens in the 3a-th lens, and vd3ga2 is an Abbe number of the negative lens in the 3a-th lens.

By satisfying the conditional expression (7), chromatic aberrations generated in the third lens group are corrected in an excellent condition. When the value of the conditional expression (7) becomes lower than the upper limit, generation of the longitudinal chromatic aberration which is more over-corrected for g-line than that for d-line can be controlled to be small. When the value exceed the lower limit, the longitudinal chromatic aberration showing the opposite property can be controlled to be small.

In the above zoom lenses, it is preferable that the second lens group consists of, in order from the object side; a negative lens, a negative lens and a positive lens.

By providing the second lens group formed of, in order from the object side; a negative lens, a negative lens and a positive lens, curvature of field, distortion and magnification chromatic aberration can be corrected in an excellent condition.

Herein, it is more preferable that the second lens group consists of, in order from the object side; a negative lens, and a cemented lens composed of a negative lens and a positive lens. In the case the second lens group consists of, in order from the object side; a negative single lens, a negative single lens and a positive single lens, the group is composed of three elements. In comparison with the structure, when that the second lens group consists of a negative lens and a cemented lens composed of a negative lens and a positive lens, the number of components of the lens group is reduced to two elements, which decreases the errors of lens intervals caused when the lenses are attached to a lens barrel and factors of a decentration error and is intended to enhance the productivity.

In the above zoom lenses, it is preferable that the positive lens arranged closest to an image side in the third lens group is a plastic lens and comprises an aspheric surface, and the zoom lens satisfies the following conditional expression.

$$5.0 < f3gb/f3ga < 20 \quad (8)$$

By forming the positive lens arranged closest to an image side in the third lens group out of plastic, the reduced cost is achieved in comparison with the use of glass lens. Further, when at least one aspheric surface is provided in the plastic lens arranged closest to an image side in the third lens group and arranged at a position away from the aperture stop, coma and astigmatism can be corrected properly. By satisfying the conditional expression (8), the optical system is downsized and ensures excellent optical performance. When the value of the conditional expression (8) becomes lower than the upper limit, the power of the 3b-th lens group does not become excessively weak and coma and astigmatism caused in the 3a-th lens group are easily corrected. When the value of the conditional expression (8) exceeds the lower limit, the power of the 3b-th lens group does not become excessively strong, which avoids the position of the principal point from being arranged closed to the image side. Thereby, an optical system funned of the first through third lens groups has a shorter back focal length, which downsizes the optical system.

In the above zoom lenses, it is preferable that the fourth lens group consists of one positive lens formed of plastic, and at least one surface of the positive lens in the fourth lens is formed in an aspheric shape.

By forming the fourth lens group of a plastic lens, a lowered cost is achieved in comparison with a glass lens is employed.

Further, in a four-element zoom lens, there is no optical element with power at the rear of the fourth lens group. Therefore, aberrations generated in the fourth lens group are not enlarged in the succeeding optical path and is inconspicuous. Therefore, even when the fourth lens group is composed of a plastic lens which has a low refractive index, such the structure causes small deterioration of optical performance caused by a temperature change and small effects to the optical performance of the whole lens system.

Further, since the number of the fourth lens group is as small as one, a reduced cost is achieved in comparison with a case that plural lenses are employed in the fourth lens group. Since at least one surface in the fourth lens group is formed into an aspheric surface, aberrations such that distortion for an off-axis light flux can be corrected.

When the focusing operation is carried out from an object at infinity to an object at a short range, it is more preferable that the fourth lens group is moved. In a zoom lens wherein the focusing operation is carried out by the first lens group, when the first lens group is driven for adjusting the focal position to the object at a short range, the diameter of the forefront lens becomes large in order to ensure the light amount at the periphery and the length of the whole lens system becomes enlarged. The focusing operation carried out by the fourth lens group does not cause such the problem, which is advantageous for downsizing. Since a burden applied to a drive mechanism for moving the fourth lens group becomes small, a zoom lens with less electric consumption and a simple structure can be realized.

In the above zoom lenses, it is preferable that the first lens group comprises a surface formed in an aspheric shape.

In the first lens group, a position where an off-axis ray passes through changes greatly from the wide-angle end to the telephoto end, which causes coma largely. Especially in a zoom lens with high variable power, the optical path changes greatly and coma is hardly corrected. However, since at least one surface in the first lens group is formed into an aspheric surface, the aberration correction in the varying power operation is carried out in an excellent condition.

In the above zoom lenses, it is preferable that the following conditional expression is satisfied.

$$40 < vd1g2 - vd1g1 \quad (9)$$

In the conditional expression, vd1g1 is an Abbe number of the negative lens in the first lens group, and vd1g2 is an Abbe number of the positive lens in the first lens group.

By satisfying the conditional expression (9), chromatic aberrations caused in the first lens group can be corrected in an excellent condition. When the value of the conditional expression (9) exceeds the lower limit, excellent correction of chromatic aberration becomes easy. Concretely, such the condition avoids generation of a longitudinal chromatic aberration which is more under-corrected for g-line than d-line and a generation of a magnification chromatic aberration which makes the image height lower for g-line than d-line.

In the above zoom lenses, it is preferable that a negative lens arranged second closest to the object side and a positive lens arranged closest to the image side in the second lens group satisfy the following conditional expression.

$$20 < vd2g2 - vd2g3 \quad (10)$$

In the conditional expression, vd2g2 is an Abbe number of the negative lens arranged second closest to the object side in the second lens group, and vd3g2 is an Abbe number of the positive lens closest to the image side in the second lens group.

By satisfying the conditional expression (10), chromatic aberrations caused in the second lens group can be corrected in an excellent condition. When the value of the conditional expression (10) exceeds the lower limit, excellent correction of chromatic aberration becomes easy. Concretely, such the condition avoids generation of a longitudinal chromatic aberration which is more under-corrected for g-line than d-line and a generation of a magnification chromatic aberration which makes the image height lower for g-line than d-line.

In the above zoom lenses, it is preferable that the following conditional expression is satisfied.

$$038 < |f2g|/(fw \times ft)^{1/2} < 0.53 \quad (11)$$

The conditional expression (11) is a conditional expression which further restricts the range of the conditional expression (4), and its effect is the same as the conditional expression (4).

In the above zoom lenses, it is preferable that the following conditional expression is satisfied.

$$2.0 < f1g/(fw \times ft)^{1/2} < 2.7 \quad (12)$$

The conditional expression (12) is a conditional expression which further restricts the range of the conditional expression (5), and its effect is the same as the conditional expression (5).

EXAMPLES

Examples of the zoom lenses relating to the present invention will be described below. The following symbols will be used for the examples.

f: Focal length of the whole optical system of the zoom lens
Fno: F number
fB: Back focal length (distance from the rear surface of the parallel flat plate located at the rearmost position in the zoom lens to the image pickup surface)
2ω: Angle of view
R: Curvature radius
D: Surface distance on the optical axis
Nd: Refractive index of a lens material for d-line
vd: Abbe number of a lens material
L: Length of the whole lens system In each example, a surface number followed by an asterisk "*" represents a surface in an aspheric shape. The aspheric surface is represented by Math 1, where the origin is positioned at the top of the surface, the X-axis extends along the optical axis, and h represents height along the direction perpendicular to the optical axis.

$$X = \frac{h^2/R}{1 + \sqrt{1 - (1+K)h^2/R^2}} + \Sigma A_i h^i \quad [\text{Math. 1}]$$

In the expression, $A_i$ is the i-th aspheric surface coefficient and K is a conic constant. In the aspheric surface coefficient, the power of 10 is represented by E (for example, $2.5 \times 10^{-02}$ is represented by 2.5E–02).

Example 1

| Specifications |
|---|
| f: 4.7-14.5-44.7 |
| Fno: 3.48-4.65-5.81 |
| fB: 1.001 |
| 2ω: 81°-31°-10° |

| Lens Surface Data | | | | |
|---|---|---|---|---|
| Surface Number | R(mm) | D(mm) | Nd | vd |
| 1 | 15.623 | 0.70 | 1.92286 | 20.8 |
| 2 | 13.481 | 0.01 | 1.514 | 42.8 |
| 3 | 13.481 | 3.90 | 1.496997 | 81.6 |
| 4(*) | −111.308 | d1 | | |
| 5 | −119.829 | 0.70 | 1.903658 | 31.3 |
| 6 | 6.002 | 2.96 | | |
| 7 | −23.074 | 0.55 | 1.516798 | 64.1 |
| 8 | 7.351 | 0.01 | 1.514 | 42.8 |
| 9 | 7.351 | 1.77 | 1.92286 | 20.8 |
| 10 | 28.344 | d2 | | |
| 11(Stop) | Infinity | 0.50 | | |
| 12 | 3.980 | 4.11 | 1.516798 | 64.1 |
| 13 | −10.000 | 0.01 | 1.514 | 42.8 |
| 14 | −10.000 | 0.50 | 1.805181 | 25.4 |
| 15 | 25.752 | 0.53 | | |
| 16(*) | 7.854 | 1.03 | 1.903658 | 31.3 |
| 17(*) | 7.493 | d3 | | |
| 18(*) | 59.997 | 1.36 | 1.496997 | 81.6 |
| 19(*) | −21.451 | d4 | | |
| 20 | Infinity | 1.50 | 1.5168 | 64.2 |
| 21 | Infinity | fB | | |

| Aspheric Surface Coefficient | |
|---|---|
| 4th Surface | K = 0 |
| | A4 = 0.2099E−04 |
| | A6 = −0.1023E−07 |
| | A8 = −0.4469E−09 |
| | A10 = 0.5242E−11 |
| | A12 = −0.2257E−13 |
| 16th Surface | K = 0.0000 |
| | A4 = −0.6147E−02 |
| | A6 = −0.7521E−03 |
| | A8 = 0.1299E−04 |
| | A10 = −0.8256E−05 |
| 17th Surface | K = 0 |
| | A4 = −0.4454E−02 |
| | A6 = −0.6724E−03 |
| | A8 = 0.3996E−04 |
| 18th Surface | K = 0 |
| | A4 = −0.1158E−02 |
| | A6 = 0.3294E−04 |
| | A8 = −0.4467E−05 |
| 19th Surface | K = 0 |
| | A4 = −0.1110E−02 |
| | A6 = 0.2548E−04 |

-continued

|  |  |
|---|---|
| A8 | = −0.3541E−05 |
| A10 | = 0.1106E−07 |

Data Relating to Variable Power

| f | Fno | d1 | d2 | d3 | d4 |
|---|---|---|---|---|---|
| 4.70 | 3.48 | 0.60 | 16.60 | 3.89 | 3.09 |
| 14.49 | 4.65 | 6.99 | 4.97 | 2.65 | 9.58 |
| 44.66 | 5.81 | 15.58 | 1.08 | 13.05 | 4.14 |

Lens Group Data

| Lens Group | Forefront Surface | Focal Length (mm) |
|---|---|---|
| 1 | 1 | 31.02 |
| 2 | 5 | −6.26 |
| 3 | 11 | 10.10 |
| 4 | 18 | 31.88 |

Values of Conditional Expressions

Conditional Expression (1) = 1.30
Conditional Expression (2) = 0.62
Conditional Expression (3) = 0.70
Conditional Expression (4) = 0.43
Conditional Expression (5) = 2.14
Conditional Expression (6) = 45.89
Conditional Expression (7) = 38.74
Conditional Expression (8) = 45.89
Conditional Expression (9) = 60.73
Conditional Expression (10) = 43.32
Conditional Expression (11) = 0.43

Figure 1B:
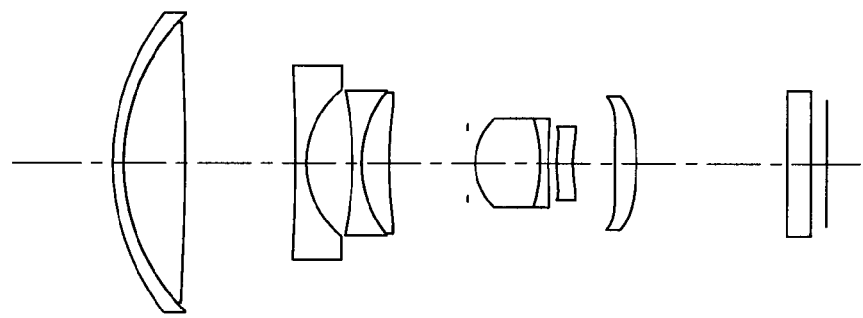
Figure 1C:
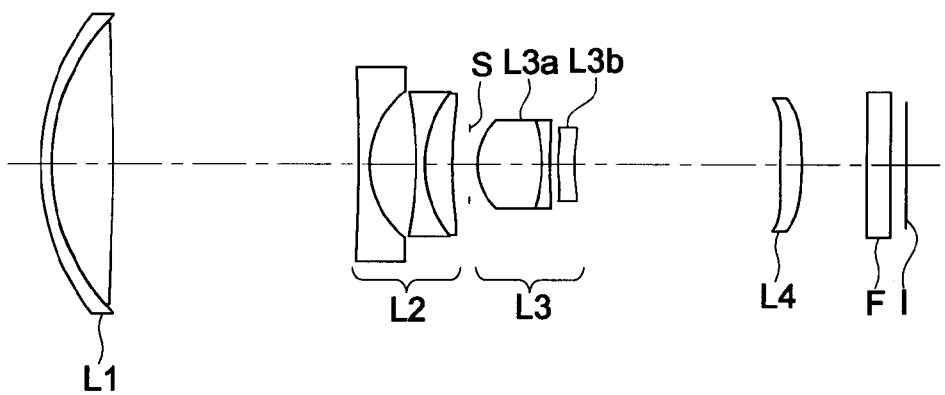

FIGS. 1A to 1C show sectional views of the zoom lens of Example 1. FIG. 1A shows the sectional view at the wide-angle end, FIG. 1B shows the sectional view at the middle focal length and FIG. 1C shows the sectional view at the telephoto end. The present zoom lens is composed of first lens group L1 with positive refractive power, second lens group L2 with negative refractive power, third lens group L3 with positive refractive power, fourth lens group L4 with positive refractive power. The first lens group L1 is composed of a negative lens and a positive lens. The second lens group L2 is composed of a negative lens, a negative lens and a positive lens. The third lens group L3 is composed of the 3a-th lens group L3a which is a cemented lens formed of a positive lens and a negative lens, and the 3b-th lens group L3b which is a positive lens. In FIGS. 1A to 1C, S represents an aperture stop, F represents a parallel flat plate such as an optical low-pass filter, IR-cut filter and a sealing glass of a solid-state image pickup element, and I represents an image pickup surface.

Figure 2:
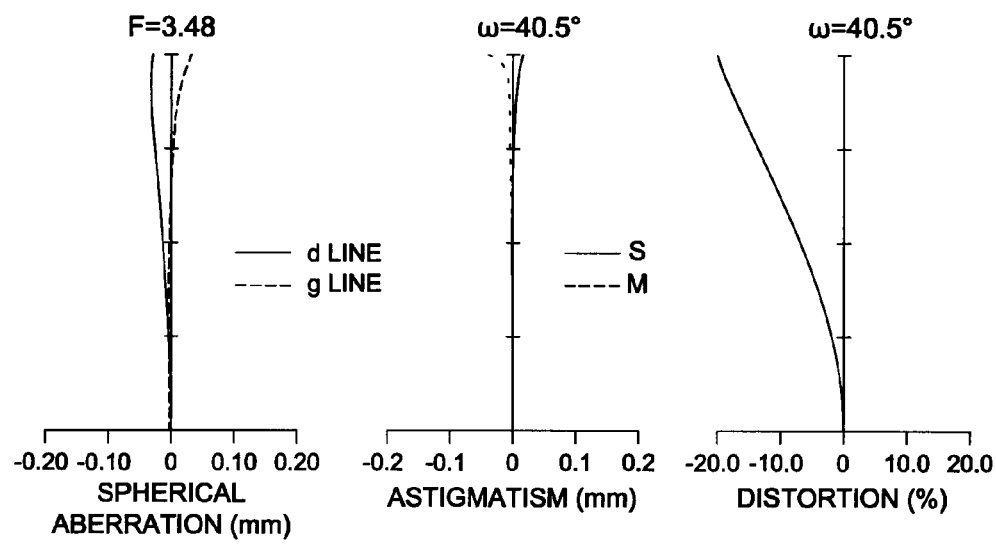
FIG. 2 shows aberration diagrams of the zoom lens of Example 1 at the wide-angle end.
Figure 3:
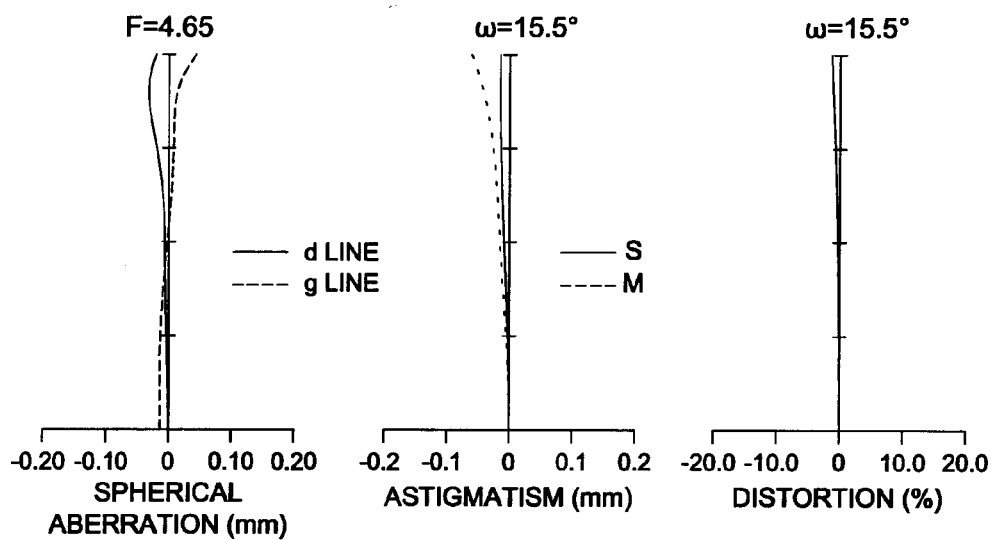
FIG. 3 shows aberration diagrams of the zoom lens of Example 1 at a middle focal length.
Figure 4:
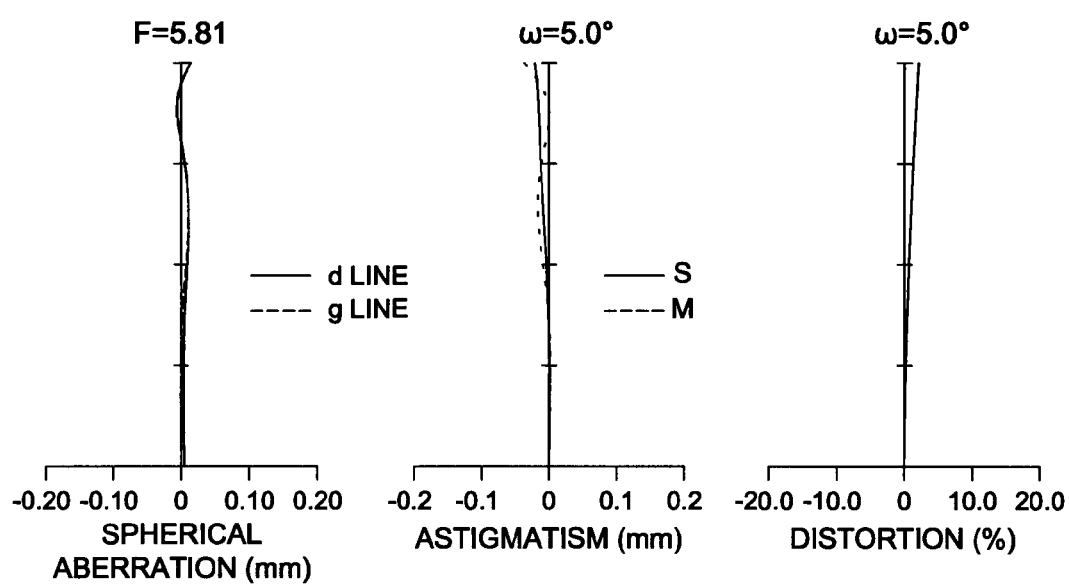
FIG. 4 shows aberration diagrams of the zoom lens of Example 1 at the telephoto end.

FIG. 2 shows aberration diagrams (spherical aberration, astigmatic aberration and distortion) of the zoom lens of Example 1 at the wide-angle end. FIG. 3 shows aberration diagrams (spherical aberration, astigmatic aberration and distortion) of the zoom lens of Example 1 at a middle focal length. FIG. 4 shows aberration diagrams (spherical aberration, astigmatic aberration and distortion) of the zoom lens of Example 1 at the telephoto end.

Example 2

Specifications f: 4.7-14.5-44.7
Fno: 3.42-4.47-5.72
fB: 1.001
2ω: 81°-31°-10°

Lens Surface Data

| Surface Number | R(mm) | D(mm) | Nd | νd |
|---|---|---|---|---|
| 1 | 16.003 | 0.70 | 1.846663 | 23.7 |
| 2 | 13.434 | 0.01 | 1.514 | 42.8 |
| 3 | 13.434 | 4.71 | 1.496997 | 81.6 |
| 4(*) | −128.866 | d1 | | |
| 5 | −179.392 | 0.70 | 1.883 | 40.8 |
| 6 | 6.275 | 3.13 | | |
| 7 | −33.570 | 0.55 | 1.548137 | 45.8 |
| 8 | 7.482 | 0.01 | 1.514 | 42.8 |
| 9 | 7.482 | 2.64 | 1.92286 | 20.8 |
| 10 | 27.448 | d2 | | |
| 11(Stop) | Infinity | 0.50 | | |
| 12 | 5.216 | 2.01 | 1.72916 | 54.6 |
| 13 | −23.471 | 0.01 | 1.514 | 42.8 |
| 14 | −23.471 | 0.50 | 1.784719 | 25.7 |
| 15 | 9.538 | 1.15 | | |
| 16(*) | 41.220 | 1.00 | 1.883 | 40.8 |
| 17(*) | 123.180 | d3 | | |
| 18(*) | 12.598 | 1.81 | 1.496997 | 81.6 |
| 19(*) | −101.438 | d4 | | |
| 20 | Infinity | 1.50 | 1.5168 | 64.2 |
| 21 | Infinity | fB | | |

Aspheric Surface Coefficient

| 4th Surface | A4 = 0.1895E−04 |
|---|---|
| | A6 = −0.5322E−08 |
| | A8 = −0.5387E−09 |
| | A10 = 0.7504E−11 |
| | A12 = −0.3565E−13 |
| 16th Surface | A4 = −0.4268E−03 |
| | A6 = 0.6707E−04 |
| | A8 = 0.4144E−05 |
| | A10 = −0.1379E−06 |
| 17th Surface | K = 0 |
| | A4 = 0.8274E−03 |
| | A6 = 0.9818E−04 |
| | A8 = 0.9399E−05 |
| 18th Surface | K = 0 |
| | A4 = −0.7986E−04 |
| | A6 = −0.2982E−04 |
| | A8 = −0.3121E−06 |
| 19th Surface | K = 0 |
| | A4 = 0.4390E−04 |
| | A6 = −0.5332E−04 |
| | A8 = 0.3530E−06 |
| | A10 = −0.4469E−09 |

Data Relating to Variable Power

| f | Fno | d1 | d2 | d3 | d4 |
|---|---|---|---|---|---|
| 4.70 | 3.42 | 0.60 | 14.84 | 1.03 | 6.44 |
| 14.49 | 4.47 | 7.44 | 3.34 | 1.61 | 10.84 |
| 44.66 | 5.72 | 16.81 | 1.14 | 16.03 | 3.09 |

Lens Group Data

| Lens Group | Forefront Surface | Focal Length (mm) |
|---|---|---|
| 1 | 1 | 32.39 |
| 2 | 5 | −6.71 |
| 3 | 11 | 12.10 |
| 4 | 18 | 22.60 |

Values of Conditional Expressions

Conditional Expression (1) = 2.50
Conditional Expression (2) = 0.55
Conditional Expression (3) = 0.84
Conditional Expression (4) = 0.46
Conditional Expression (5) = 2.24
Conditional Expression (6) = 5.00
Conditional Expression (7) = 28.95

-continued

| | |
|---|---|
| Conditional Expression (8) = 5.00 | |
| Conditional Expression (9) = 57.82 | |
| Conditional Expression (10) = 24.94 | |
| Conditional Expression (11) = 0.46 | |

Figure 5A:
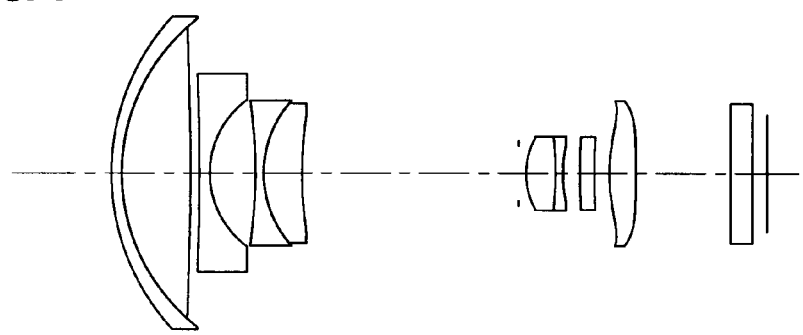
FIGS. 5A, 5B and 5C show sectional views of the zoom lens of Example 2.
Figure 5B:
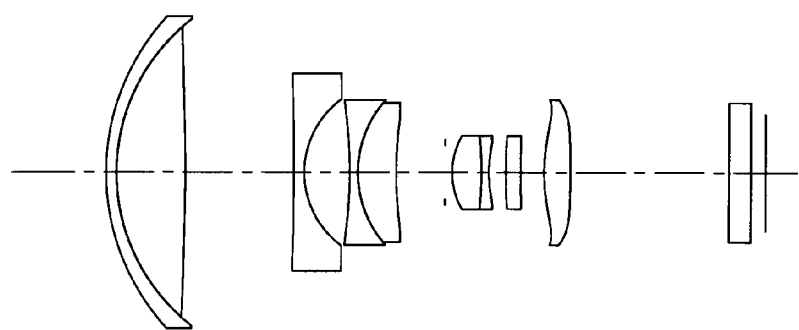
Figure 5C:
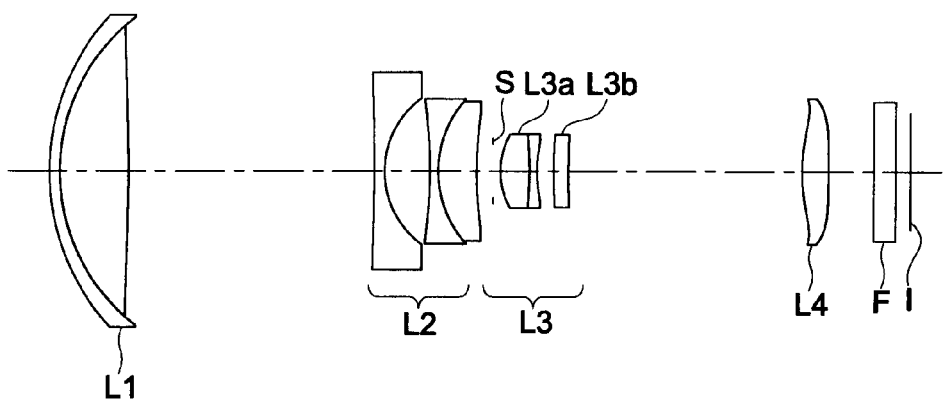

FIGS. 5A to 5C show sectional views of the zoom lens of Example 2. FIG. 5A shows the sectional view at the wide-angle end, FIG. 5B shows the sectional view at the middle focal length and FIG. 5C shows the sectional view at the telephoto end. The present zoom lens is composed of first lens group L1 with positive refractive power, second lens group L2 with negative refractive power, third lens group L3 with positive refractive power, fourth lens group L4 with positive refractive power. The first lens group L1 is composed of a negative lens and a positive lens. The second lens group L2 is composed of a negative lens, a negative lens and a positive lens. The third lens group L3 is composed of the 3$a$-th lens group L3$a$ which is a cemented lens formed of a positive lens and a negative lens, and the 3$b$-th lens group L3$b$ which is a positive lens. In FIGS. 5A to 5C, S represents an aperture stop, F represents a parallel flat plate such as an optical low-pass filter, IR-cut filter and a sealing glass of a solid-state image pickup element, and I represents an image pickup surface.

Figure 6:
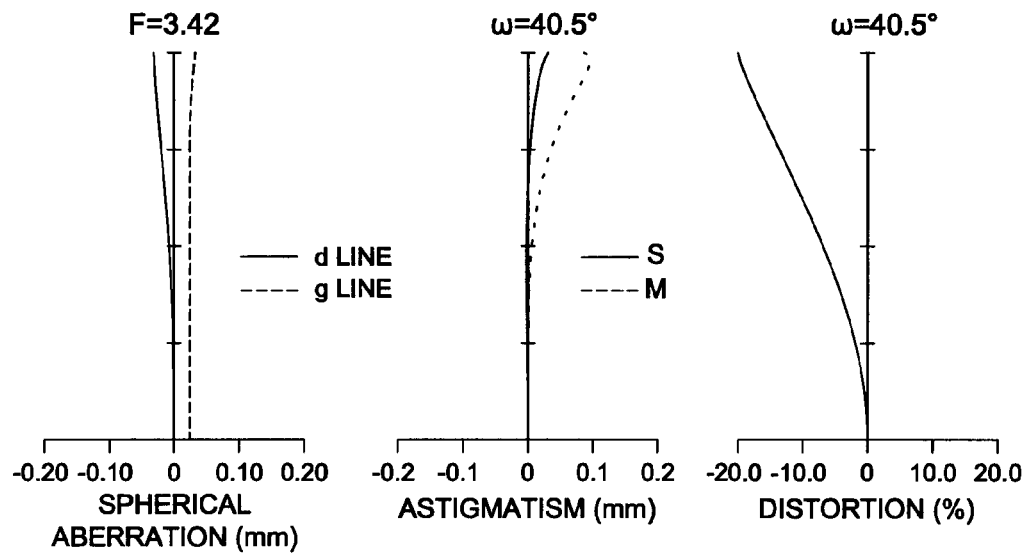
FIG. 6 shows aberration diagrams of the zoom lens of Example 2 at the wide-angle end.
Figure 7:
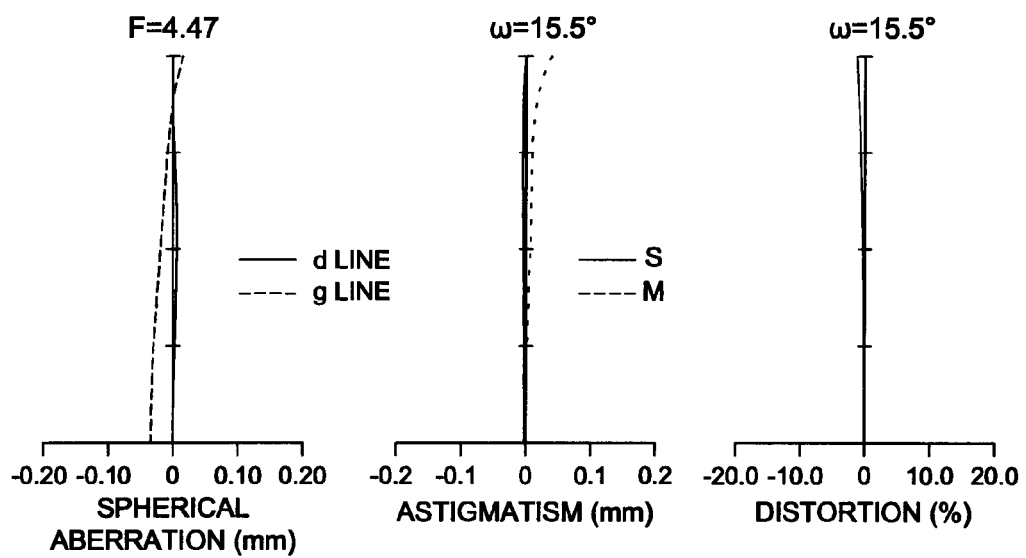
FIG. 7 shows aberration diagrams of the zoom lens of Example 2 at a middle focal length.
Figure 8:
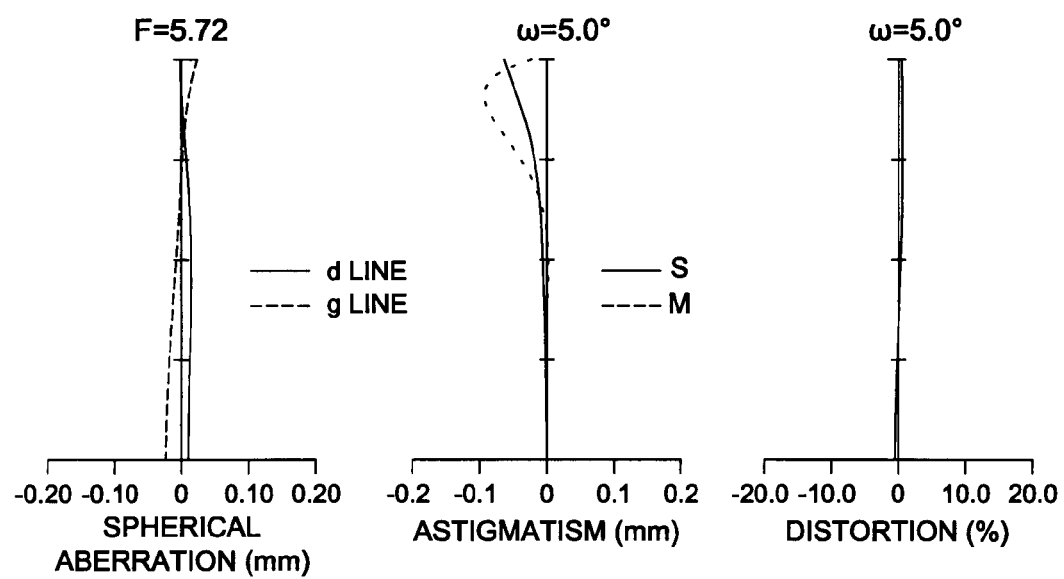
FIG. 8 shows aberration diagrams of the zoom lens of Example 2 at the telephoto end.

FIG. 6 shows aberration diagrams (spherical aberration, astigmatic aberration and distortion) of the zoom lens of Example 2 at the wide-angle end. FIG. 7 shows aberration diagrams (spherical aberration, astigmatic aberration and distortion) of the zoom lens of Example 2 at a middle focal length. FIG. 8 shows aberration diagrams (spherical aberration, astigmatic aberration and distortion) of the zoom lens of Example 2 at the telephoto end.

Example 3

Specifications f: 4.7-14.5-44.7
Fno: 3.51-4.54-5.86
fB: 1.001
2ω: 81°-31°-10°

Lens Surface Data

| Surface number | R(mm) | D(mm) | Nd | vd |
|---|---|---|---|---|
| 1 | 15.706 | 0.70 | 1.846663 | 23.7 |
| 2 | 13.402 | 0.01 | 1.514 | 42.8 |
| 3 | 13.402 | 4.71 | 1.496997 | 81.6 |
| 4(*) | −117.677 | d1 | | |
| 5 | −135.042 | 0.70 | 1.903658 | 31.3 |
| 6 | 6.583 | 3.00 | | |
| 7 | −25.439 | 0.55 | 1.620409 | 60.3 |
| 8 | 7.712 | 0.01 | 1.514 | 42.8 |
| 9 | 7.712 | 1.91 | 1.92286 | 20.8 |
| 10 | 50.556 | d2 | | |
| 11(Stop) | Infinity | 0.50 | | |
| 12 | 4.012 | 3.43 | 1.56384 | 60.8 |
| 13 | −25.477 | 0.01 | 1.514 | 42.8 |
| 14 | −25.477 | 0.80 | 1.846663 | 23.7 |
| 15 | 8.969 | 0.53 | | |
| 16(*) | 7.087 | 1.00 | 1.903658 | 31.3 |
| 17(*) | 7.008 | d3 | | |
| 18(*) | 12.384 | 2.14 | 1.72916 | 54.6 |
| 19(*) | −62.324 | d4 | | |
| 20 | Infinity | 1.50 | 1.5168 | 64.2 |
| 21 | Infinity | fB | | |

-continued

Aspheric Surface Coefficient

| | |
|---|---|
| 4th Surface | A4 = 0.2217E−04 |
| | A6 = −0.1244E−07 |
| | A8 = −0.4200E−09 |
| | A10 = 0.5513E−11 |
| | A12 = −0.2452E−13 |
| 16th Surface | A4 = −0.6004E−02 |
| | A6 = −0.5872E−03 |
| | A8 = 0.1290E−04 |
| | A10 = −0.9190E−05 |
| 17th Surface | K = 0 |
| | A4 = −0.4024E−02 |
| | A6 = −0.4162E−03 |
| | A8 = 0.2001E−04 |
| 18th Surface | K = 0 |
| | A4 = −0.1659E−03 |
| | A6 = −0.1428E−04 |
| | A8 = −0.9612E−07 |
| 19th Surface | K = 0 |
| | A4 = −0.1332E−03 |
| | A6 = −0.3142E−04 |
| | A8 = 0.6768E−06 |
| | A10 = −0.8926E−08 |

Data Relating to Variable Power

| f | Fno | d1 | d2 | d3 | d4 |
|---|---|---|---|---|---|
| 4.70 | 3.51 | 0.60 | 15.09 | 1.19 | 4.69 |
| 14.49 | 4.54 | 7.67 | 3.96 | 1.76 | 8.68 |
| 44.66 | 5.86 | 16.36 | 2.18 | 14.66 | 3.00 |

Lens Group Data

| Lens Group | Forefront Surface | Focal Length (mm) |
|---|---|---|
| 1 | 1 | 31.10 |
| 2 | 5 | −6.66 |
| 3 | 11 | 12.16 |
| 4 | 18 | 14.28 |

Values of Conditional Expressions

| | |
|---|---|
| Conditional Expression (1) = 2.97 | |
| Conditional Expression (2) = 0.55 | |
| Conditional Expression (3) = 0.70 | |
| Conditional Expression (4) = 0.46 | |
| Conditional Expression (5) = 2.15 | |
| Conditional Expression (6) = 10.14 | |
| Conditional Expression (7) = 37.04 | |
| Conditional Expression (8) = 10.14 | |
| Conditional Expression (9) = 57.82 | |
| Conditional Expression (10) = 39.46 | |
| Conditional Expression (11) = 0.46 | |

Figure 9A:
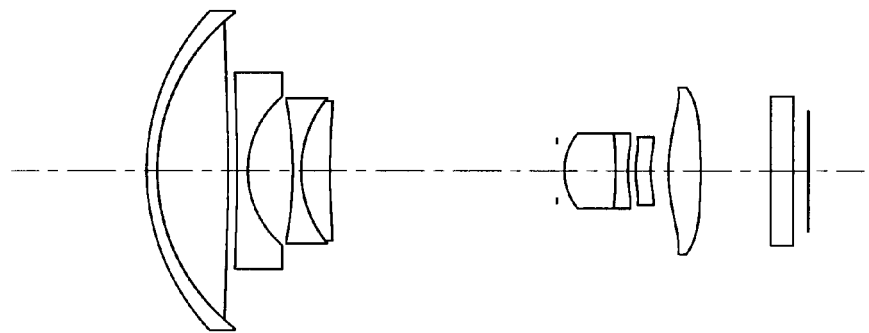
FIGS. 9A, 9B and 9C show sectional views of the zoom lens of Example 3.
Figure 9B:
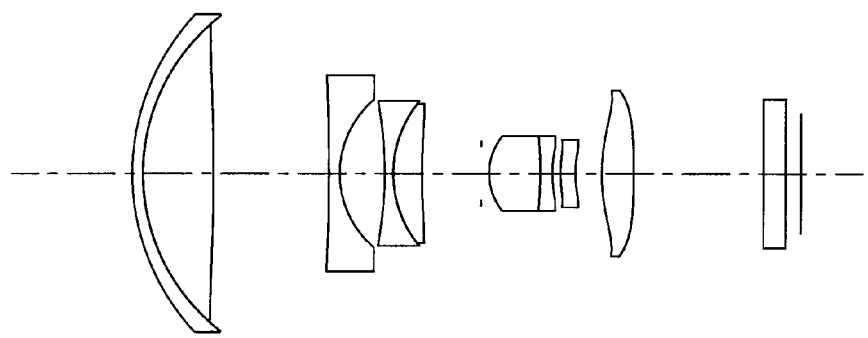
Figure 9C:
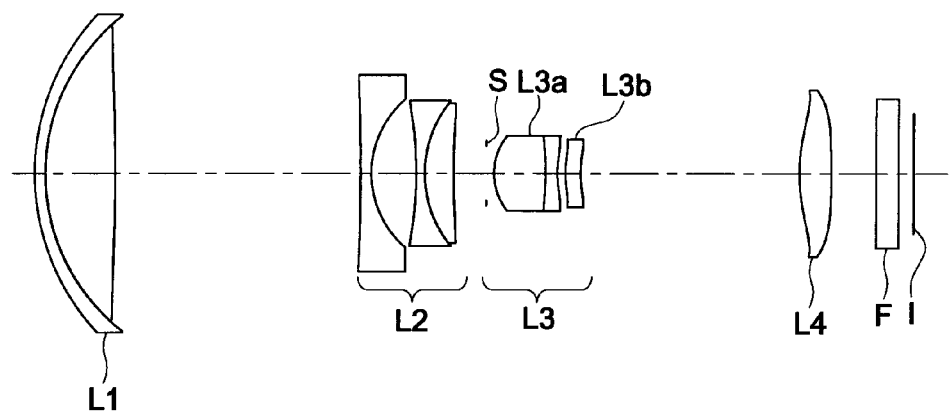

FIGS. 9A to 9C show sectional views of the zoom lens of Example 3. FIG. 9A shows the sectional view at the wide-angle end, FIG. 9B shows the sectional view at the middle focal length and FIG. 9C shows the sectional view at the telephoto end. The present zoom lens is composed of first lens group L1 with positive refractive power, second lens group L2 with negative refractive power, third lens group L3 with positive refractive power, fourth lens group L4 with positive refractive power. The first lens group L1 is composed of a negative lens and a positive lens. The second lens group L2 is composed of a negative lens, a negative lens and a positive lens. The third lens group L3 is composed of the 3$a$-th lens group L3$a$ which is a cemented lens formed of a positive lens and a negative lens, and the 3$b$-th lens group L3$b$ which is a positive lens. In FIGS. 9A to 9C, S represents an aperture stop, F represents a parallel flat plate such as an optical low-pass filter, IR-cut filter and a sealing glass of a solid-state image pickup element, and I represents an image pickup surface.

Figure 10:
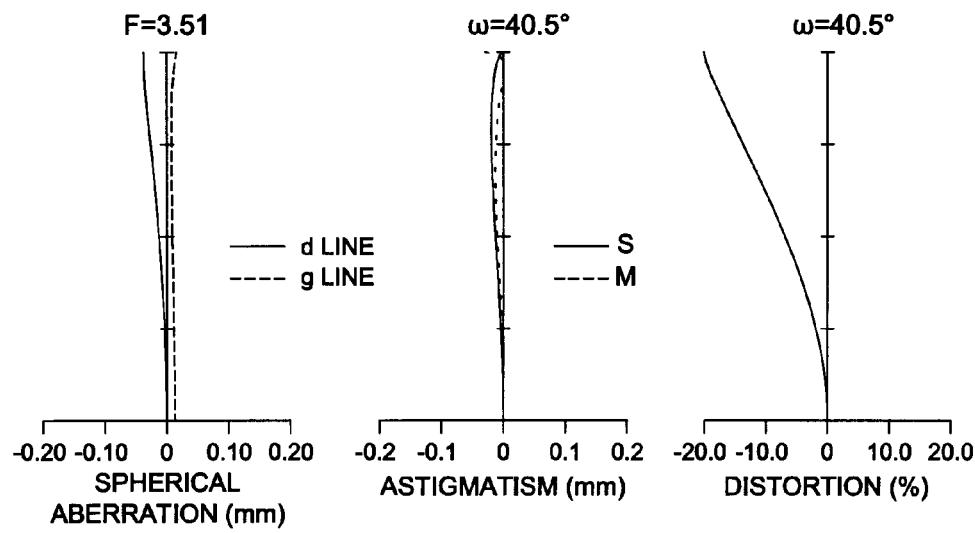
FIG. 10 shows aberration diagrams of the zoom lens of Example 3 at the wide-angle end.
Figure 11:
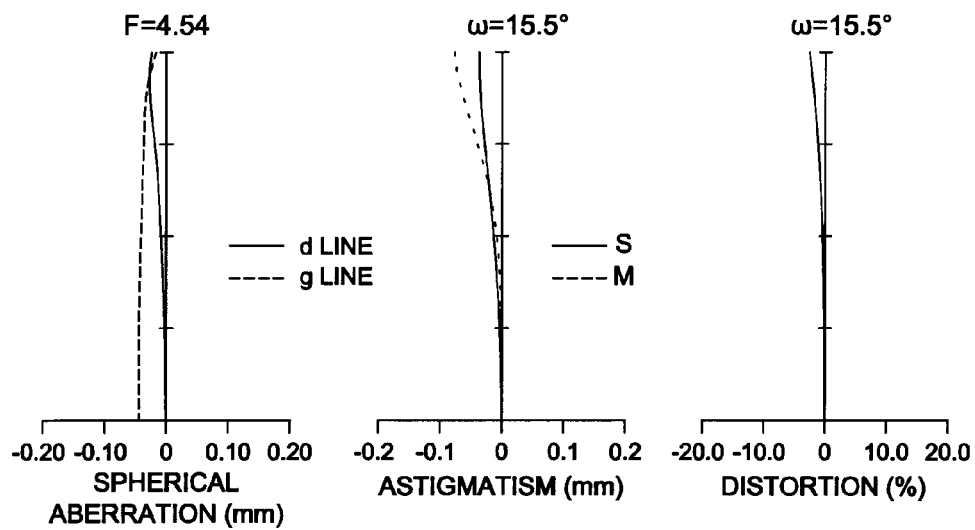
FIG. 11 shows aberration diagrams of the zoom lens of Example 3 at a middle focal length.
Figure 12:
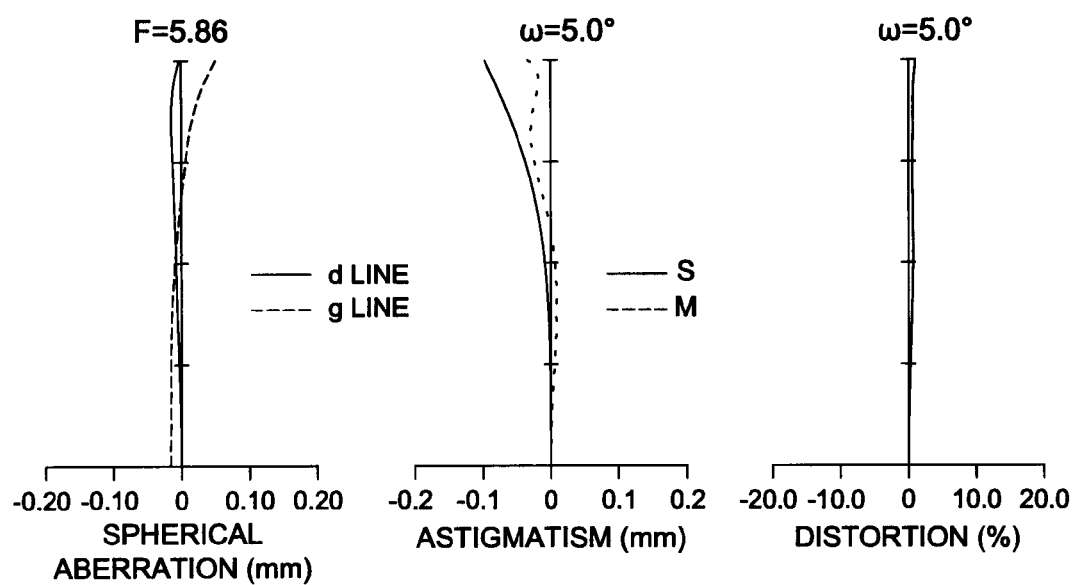
FIG. 12 shows aberration diagrams of the zoom lens of Example 3 at the telephoto end.

FIG. 10 shows aberration diagrams (spherical aberration, astigmatic aberration and distortion) of the zoom lens of Example 3 at the wide-angle end. FIG. 11 shows aberration diagrams (spherical aberration, astigmatic aberration and distortion) of the zoom lens of Example 3 at a middle focal length. FIG. 12 shows aberration diagrams (spherical aberration, astigmatic aberration and distortion) of the zoom lens of Example 3 at the telephoto end.

Example 4

Specifications f: 4.6-14.2-43.7
Fno: 3.43-4.73-5.83
fB: 1.001
2ω: 82°-32°-11°

Lens Surface Data

| Surface number | R(mm) | D(mm) | Nd | vd |
|---|---|---|---|---|
| 1 | 18.677 | 0.70 | 1.92286 | 20.8 |
| 2 | 16.177 | 0.01 | 1.514 | 42.8 |
| 3 | 16.177 | 3.73 | 1.496997 | 81.6 |
| 4(*) | −128.626 | d1 | | |
| 5 | −159.422 | 0.70 | 1.903658 | 31.3 |
| 6 | 7.081 | 3.65 | | |
| 7 | −22.000 | 0.55 | 1.496997 | 81.6 |
| 8 | 9.491 | 0.01 | 1.514 | 42.8 |
| 9 | 9.491 | 1.73 | 1.92286 | 20.8 |
| 10 | 39.717 | d2 | | |
| 11(Stop) | Infinity | 0.50 | | |
| 12 | 4.356 | 4.60 | 1.617998 | 63.3 |
| 13 | −6.165 | 0.01 | 1.514 | 42.8 |
| 14 | −6.165 | 0.50 | 1.903658 | 31.3 |
| 15 | 18.318 | 0.73 | | |
| 16(*) | 6.021 | 1.03 | 1.883 | 40.8 |
| 17(*) | 5.631 | d3 | | |
| 18(*) | 11.817 | 1.55 | 1.496997 | 81.6 |
| 19(*) | 415.766 | d4 | | |
| 20 | Infinity | 1.50 | 1.5168 | 64.2 |
| 21 | Infinity | fB | | |

Aspheric Surface Coefficient

| | |
|---|---|
| 4th Surface | A4 = 0.1065E−04 |
| | A6 = 0.2877E−07 |
| | A8 = −0.9368E−09 |
| | A10 = 0.1076E−10 |
| | A12 = −0.4761E−13 |
| 16th Surface | A4 = −0.5804E−02 |
| | A6 = −0.7991E−03 |
| | A8 = 0.1242E−04 |
| | A10 = −0.7317E−05 |
| 17th Surface | K = 0 |
| | A4 = −0.4181E−02 |
| | A6 = −0.8608E−03 |
| | A8 = 0.4796E−04 |
| 18th Surface | K = 0 |
| | A4 = −0.6299E−03 |
| | A6 = 0.6833E−04 |
| | A8 = −0.2418E−05 |
| 19th Surface | K = 0 |
| | A4 = −0.7350E−03 |
| | A6 = 0.6507E−04 |
| | A8 = −0.1989E−05 |
| | A10 = −0.1485E−07 |

Data Relating to Variable Power

| f | Fno | d1 | d2 | d3 | d4 |
|---|---|---|---|---|---|
| 4.60 | 3.43 | 0.63 | 18.04 | 2.23 | 3.11 |
| 14.17 | 4.73 | 8.04 | 5.15 | 2.61 | 7.89 |
| 43.73 | 5.83 | 19.13 | 1.05 | 11.68 | 3.64 |

Lens Group Data

| Lens Group | Forefront Surface | Focal Lengh (mm) |
|---|---|---|
| 1 | 1 | 36.83 |
| 2 | 5 | −7.37 |
| 3 | 11 | 10.53 |
| 4 | 18 | 24.37 |

Values of Conditional Expressions

Conditional Expression (1) = 1.34
Conditional Expression (2) = 0.70
Conditional Expression (3) = 0.74
Conditional Expression (4) = 0.52
Conditional Expression (5) = 2.60
Conditional Expression (6) = 35.16
Conditional Expression (7) = 32.08
Conditional Expression (8) = 35.16
Conditional Expression (9) = 60.73
Conditional Expression (10) = 60.73
Conditional Expression (11) = 0.52

Figure 13A:
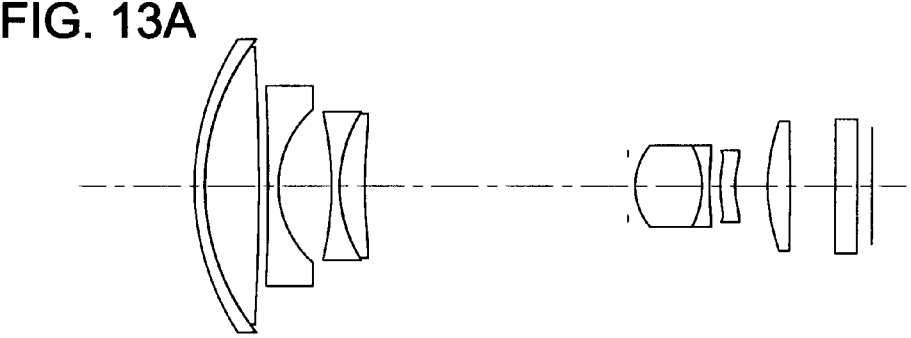
FIGS. 13A, 13B and 13C show sectional views of the zoom lens of Example 4.
Figure 13B:
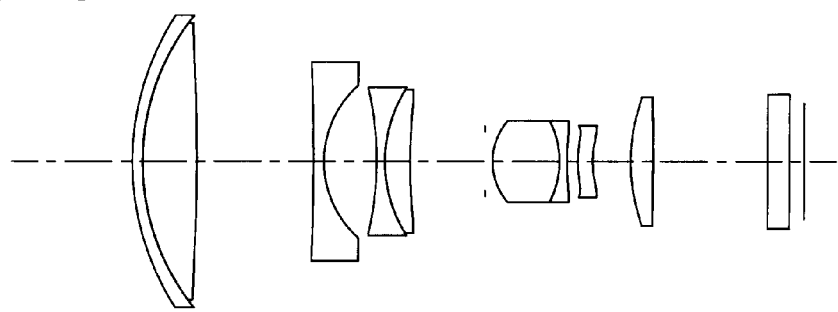
Figure 13C:
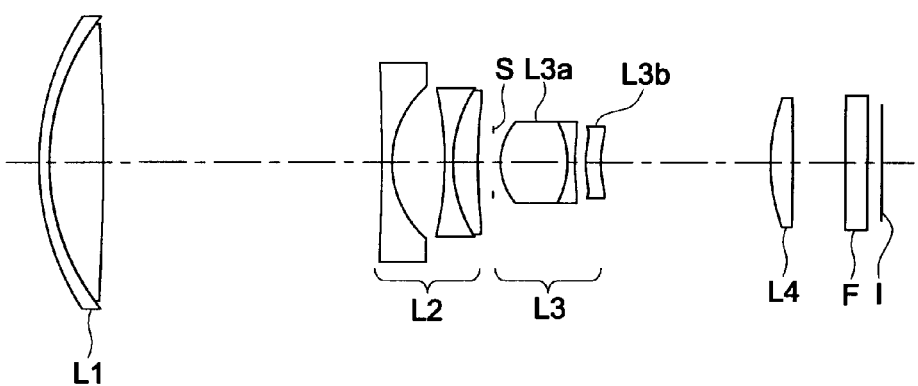

FIGS. 13A to 13C show sectional views of the zoom lens of Example 4. FIG. 13A shows the sectional view at the wide-angle end, FIG. 13B shows the sectional view at the middle focal length and FIG. 13C shows the sectional view at the telephoto end. The present zoom lens is composed of first lens group L1 with positive refractive power, second lens group L2 with negative refractive power, third lens group L3 with positive refractive power, fourth lens group L4 with positive refractive power. The first lens group L1 is composed of a negative lens and a positive lens. The second lens group L2 is composed of a negative lens, a negative lens and a positive lens. The third lens group L3 is composed of the 3a-th lens group L3a which is a cemented lens formed of a positive lens and a negative lens, and the 3b-th lens group L3b which is a positive lens. In FIGS. 13A to 13C, S represents an aperture stop, F represents a parallel flat plate such as an optical low-pass filter, IR-cut filter and a sealing glass of a solid-state image pickup element, and I represents an image pickup surface.

Figure 14:
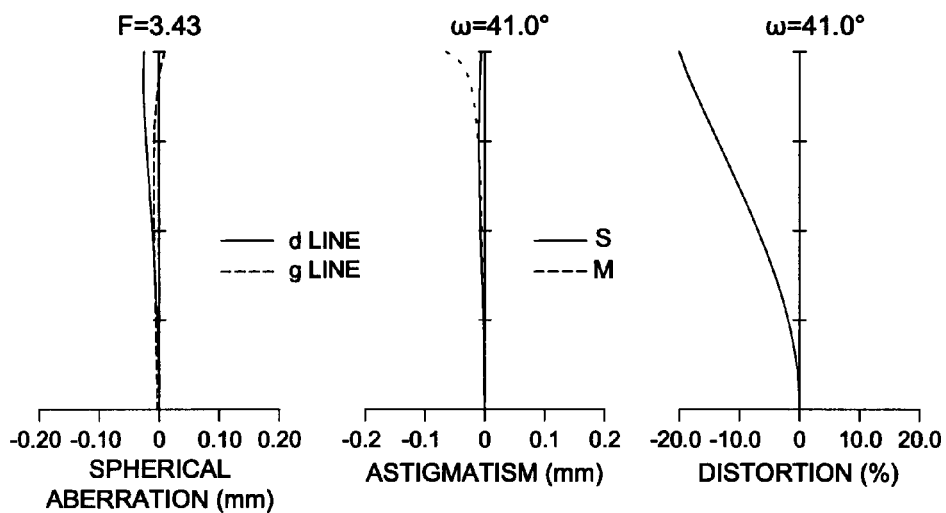
FIG. 14 shows aberration diagrams of the zoom lens of Example 4 at the wide-angle end.
Figure 15:
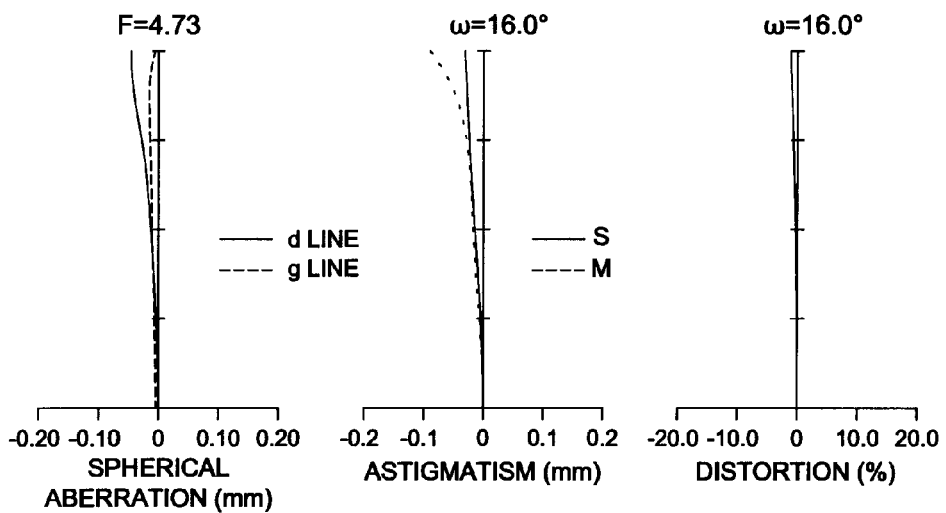
FIG. 15 shows aberration diagrams of the zoom lens of Example 4 at a middle focal length.
Figure 16:
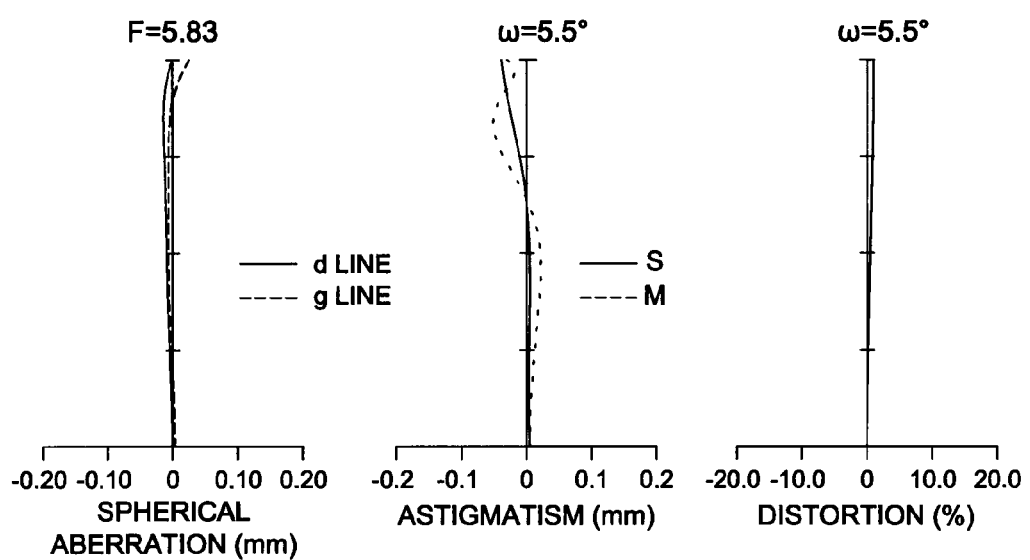
FIG. 16 shows aberration diagrams of the zoom lens of Example 4 at the telephoto end.

FIG. 14 shows aberration diagrams (spherical aberration, astigmatic aberration and distortion) of the zoom lens of Example 4 at the wide-angle end. FIG. 15 shows aberration diagrams (spherical aberration, astigmatic aberration and distortion) of the zoom lens of Example 4 at a middle focal length. FIG. 16 shows aberration diagrams (spherical aberration, astigmatic aberration and distortion) of the zoom lens of Example 4 at the telephoto end.

Example 5

Specifications f: 4.7-14.5-44.7
Fno: 3.47-4.83-5.82
fB: 1.001
2ω: 81°-31°-10°

Lens Surface Data

| Surface number | R(mm) | D(mm) | Nd | vd |
|---|---|---|---|---|
| 1 | 15.317 | 0.90 | 1.75211 | 25 |
| 2 | 12.345 | 0.01 | 1.514 | 42.8 |
| 3 | 12.345 | 3.78 | 1.495997 | 81.6 |
| 4(*) | −95.512 | d1 | | |
| 5 | −80.980 | 0.70 | 1.903658 | 31.3 |
| 6 | 5.553 | 2.59 | | |
| 7 | −26.327 | 0.55 | 1.487489 | 70.4 |
| 8 | 6.442 | 0.01 | 1.514 | 42.8 |
| 9 | 6.442 | 1.61 | 1.92286 | 20.8 |
| 10 | 19.596 | d2 | | |
| 11(Stop) | Infinity | 0.50 | | |
| 12 | 4.206 | 4.63 | 1.60625 | 63.7 |
| 13 | −4.985 | 0.01 | 1.514 | 42.8 |
| 14 | −4.985 | 0.50 | 1.903658 | 31.3 |
| 15 | 48.607 | 0.50 | | |
| 16(*) | 6.620 | 1.02 | 1.607 | 27.6 |
| 17(*) | 6.369 | d3 | | |
| 18(*) | 17.653 | 2.22 | 1.53048 | 55.7 |
| 19(*) | −34.576 | d4 | | |
| 20 | Infinity | 1.50 | 1.5168 | 64.2 |
| 21 | Infinity | fB | | |

Aspheric Surface Coefficient

| | |
|---|---|
| 4th Surface | A4 = 0.2422E−04 |
| | A6 = −0.5047E−07 |
| | A8 = 0.4064E−09 |
| | A10 = −0.5999E−11 |
| | A12 = 0.3623E−13 |
| 16th Surface | A4 = −0.7149E−02 |
| | A6 = −0.9739E−03 |
| | A8 = 0.2329E−04 |
| | A10 = −0.1000E−04 |
| 17th Surface | K = 0 |
| | A4 = −0.3853E−02 |
| | A6 = −0.8762E−03 |
| | A8 = 0.5384E−04 |
| 18th Surface | K = 0 |
| | A4 = −0.6093E−03 |
| | A6 = 0.3127E−04 |
| | A8 = −0.1646E−05 |
| 19th Surface | K = 0 |
| | A4 = −0.6924E−03 |
| | A6 = 0.1865E−04 |
| | A8 = −0.8754E−06 |
| | A10 = −0.8900E−08 |

Data Relating to Variable Power

| f | Fno | d1 | d2 | d3 | d4 |
|---|---|---|---|---|---|
| 4.70 | 3.47 | 0.60 | 13.29 | 2.18 | 3.10 |
| 14.49 | 4.83 | 6.63 | 3.96 | 2.67 | 8.54 |
| 44.67 | 5.82 | 15.53 | 1.09 | 12.04 | 3.24 |

Lens Group Data

| Lens Group | Forefront Surface | Focal Length (mm) |
|---|---|---|
| 1 | 1 | 29.69 |
| 2 | 5 | −5.74 |
| 3 | 11 | 9.43 |
| 4 | 18 | 22.26 |

Values of Conditional Expressions

Conditional Expression (1) = 1.64
Conditional Expression (2) = 0.61
Conditional Expression (3) = 0.65
Conditional Expression (4) = 0.41
Conditional Expression (5) = 2.05
Conditional Expression (6) = 49.52
Conditional Expression (7) = 32.40
Conditional Expression (8) = 49.52
Conditional Expression (9) = 56.56
Conditional Expression (10) = 49.56
Conditional Expression (11) = 0.40

Figure 17A:
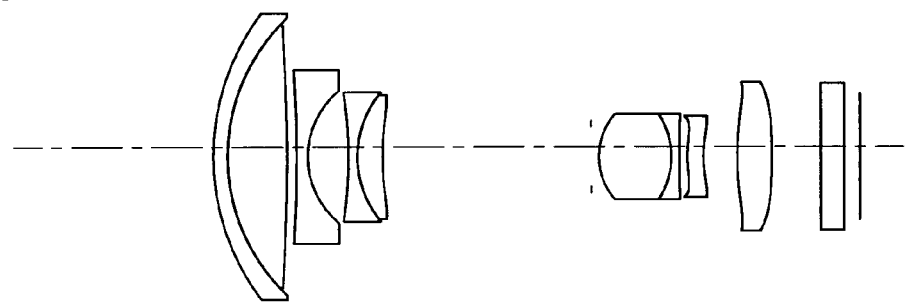
FIGS. 17A, 17B and 17C show sectional views of the zoom lens of Example 5.
Figure 17B:
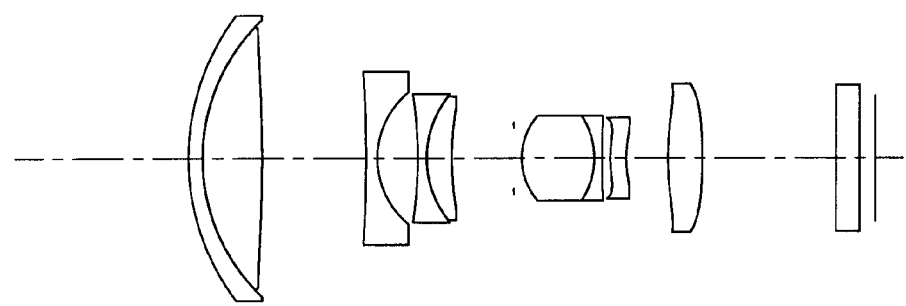
Figure 17C:
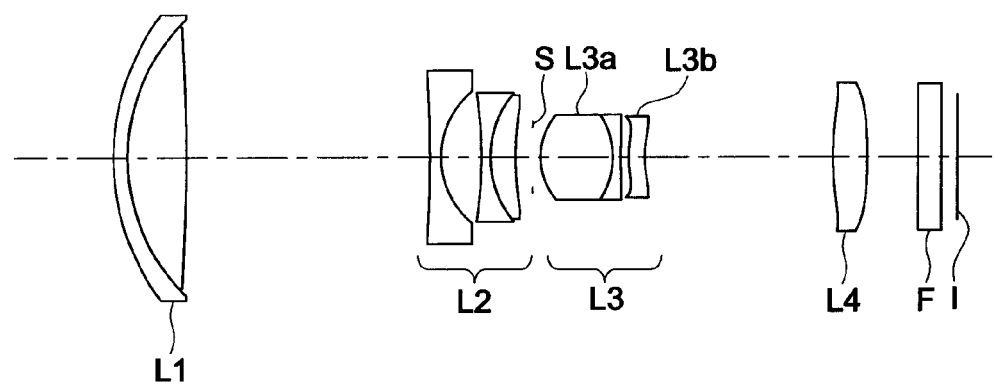

FIGS. 17A to 17C show sectional views of the zoom lens of Example 5. FIG. 17A shows the sectional view at the wide-angle end, FIG. 17B shows the sectional view at the middle focal length and FIG. 17C shows the sectional view at the telephoto end. The present zoom lens is composed of first lens group L1 with positive refractive power, second lens group L2 with negative refractive power, third lens group L3 with positive refractive power, fourth lens group L4 with positive refractive power. The first lens group L1 is composed of a negative lens and a positive lens. The second lens group L2 is composed of a negative lens, a negative lens and a positive lens. The third lens group L3 is composed of the 3a-th lens group L3a which is a cemented lens formed of a positive lens and a negative lens, and the 3b-th lens group L3b which is a positive lens. In FIGS. 17A to 17C, S represents an aperture stop, F represents a parallel flat plate such as an optical low-pass filter, IR-cut filter and a sealing glass of a solid-state image pickup element, and I represents an image pickup surface.

Figure 18:
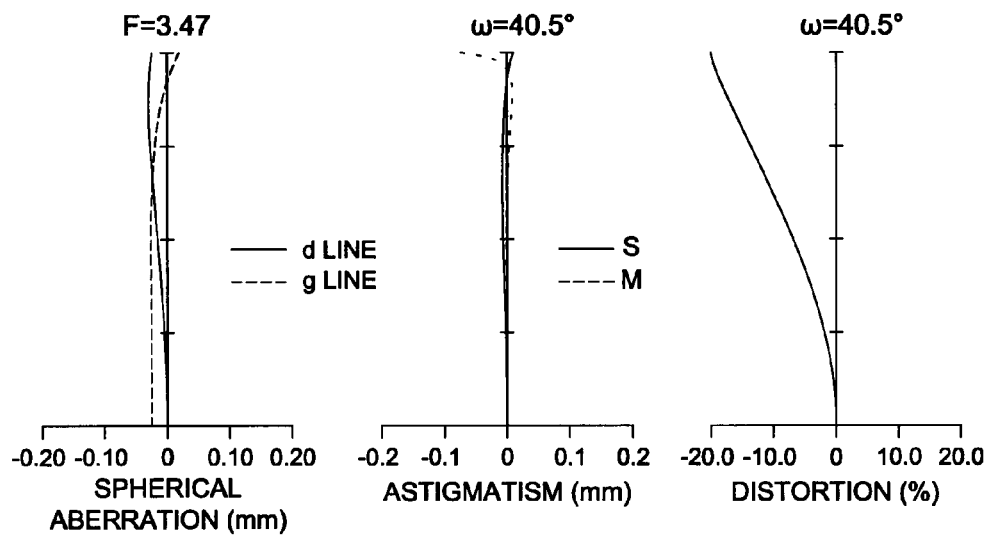
FIG. 18 shows aberration diagrams of the zoom lens of Example 5 at the wide-angle end.
Figure 19:
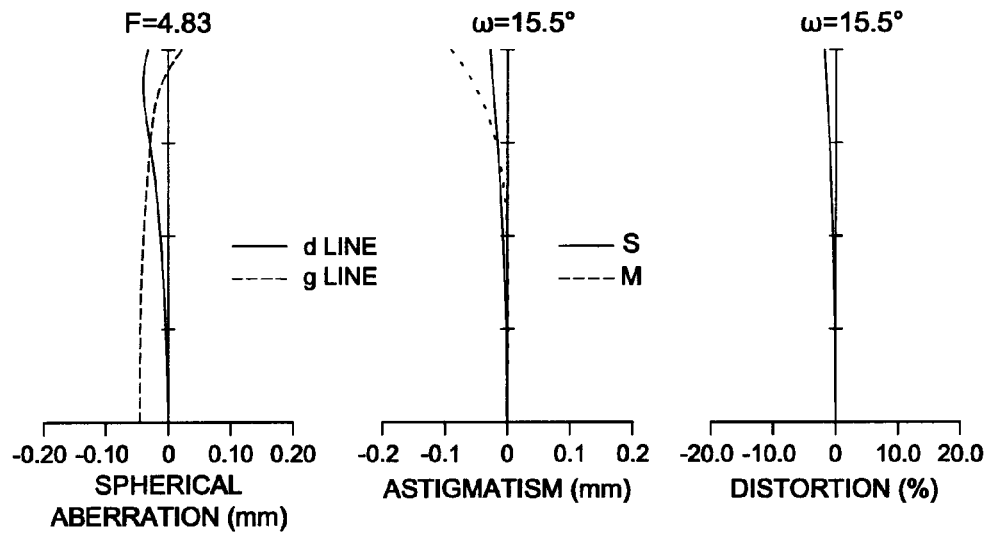
FIG. 19 shows aberration diagrams of the zoom lens of Example 5 at a middle focal length.
Figure 20:
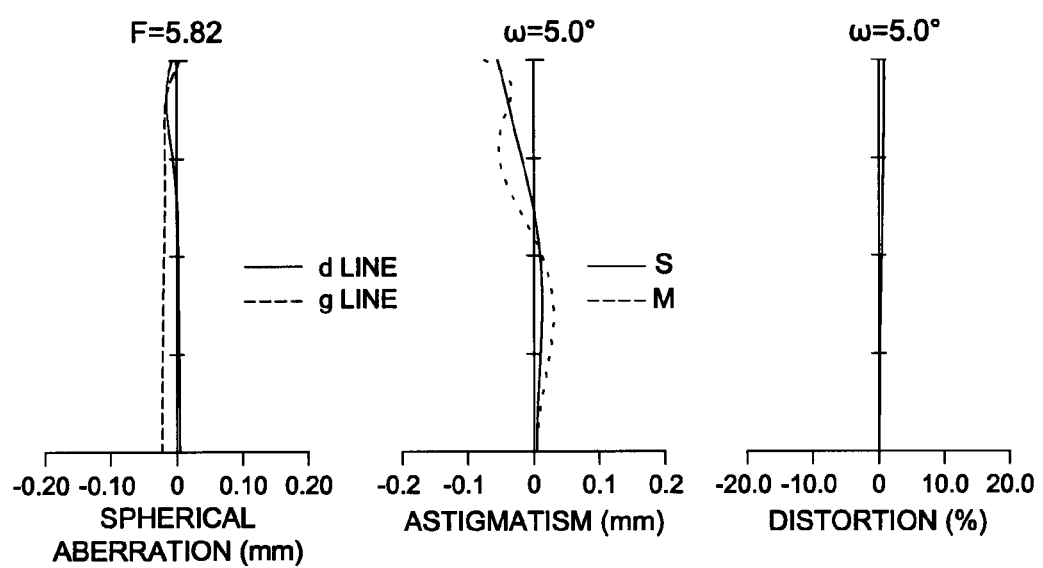
FIG. 20 shows aberration diagrams of the zoom lens of Example 5 at the telephoto end.

FIG. 18 shows aberration diagrams (spherical aberration, astigmatic aberration and distortion) of the zoom lens of Example 5 at the wide-angle end. FIG. 19 shows aberration diagrams (spherical aberration, astigmatic aberration and distortion) of the zoom lens of Example 5 at a middle focal length. FIG. 20 shows aberration diagrams (spherical aberration, astigmatic aberration and distortion) of the zoom lens of Example 5 at the telephoto end.

Example 6

Specifications f: 4.6-14.2-43.7
Fno: 3.49-4.79-5.84
fB: 1.001
2ω: 82°-32°-11°

Lens Surface Data

| Surface number | R(mm) | D(mm) | Nd | vd |
|---|---|---|---|---|
| 1 | 29.388 | 0.70 | 1.903658 | 31.3 |
| 2 | 18.168 | 0.01 | | |
| 3 | 18.168 | 2.25 | 1.496997 | 81.6 |
| 4 | 31.850 | 0.20 | | |
| 5 | 19.240 | 3.61 | 1.589129 | 61.2 |
| 6(*) | −163.925 | d1 | | |
| 7 | −102.448 | 0.70 | 1.903658 | 31.3 |
| 8 | 5.929 | 2.56 | | |
| 9 | −313.703 | 0.55 | 1.516798 | 64.1 |
| 10 | 6.265 | 0.01 | | |

-continued

| | | | | |
|---|---|---|---|---|
| 11 | 6.265 | 1.81 | 1.92286 | 20.8 |
| 12 | 17.660 | d2 | | |
| 13(Stop) | Infinity | 0.50 | | |
| 14 | 3.959 | 3.41 | 1.589129 | 61.2 |
| 15 | −35.162 | 0.01 | | |
| 16 | −35.162 | 0.50 | 1.92286 | 20.8 |
| 17 | 13.074 | 0.70 | | |
| 18(*) | 7.035 | 1.00 | 1.903658 | 31.3 |
| 19(*) | 6.661 | d3 | | |
| 20(*) | 19.907 | 1.49 | 1.496997 | 81.6 |
| 21(*) | −51.994 | d4 | | |
| 22 | Infinity | 1.50 | 1.5168 | 64.2 |
| 23 | Infinity | fB | | |

Aspheric Surface Coefficient

| | |
|---|---|
| 6th Surface | A4 = 0.8279E−05 |
| | A6 = 0.1099E−08 |
| | A8 = −0.2208E−10 |
| | A10 = −0.9045E−13 |
| | A12 = 0.3623E−13 |
| 18th Surface | A4 = −0.6186E−02 |
| | A6 = −0.8029E−03 |
| | A8 = 0.1253E−04 |
| | A10 = −0.7880E−05 |
| 19th Surface | K = 0 |
| | A4 = −0.3875E−02 |
| | A6 = −0.7285E−03 |
| | A8 = 0.5481E−04 |
| 20th Surface | K = 0 |
| | A4 = −0.1085E−02 |
| | A6 = 0.6086E−04 |
| | A8 = −0.6334E−05 |
| 21th Surface | K = 0 |
| | A4 = −0.1150E−02 |
| | A6 = 0.4809E−04 |
| | A8 = −0.6239E−05 |
| | A10 = 0.5859E−07 |

Data Relating to Variable Power

| f | Fno | d1 | d2 | d3 | d4 |
|---|---|---|---|---|---|
| 4.60 | 3.49 | 0.62 | 14.82 | 2.48 | 3.43 |
| 14.18 | 4.79 | 8.80 | 4.36 | 2.39 | 8.53 |
| 43.73 | 5.84 | 20.38 | 1.10 | 12.03 | 2.98 |

Lens Group Data

| Lens Group | Forefront Surface | Focal Length (mm) |
|---|---|---|
| 1 | 1 | 37.51 |
| 2 | 7 | −6.72 |
| 3 | 13 | 9.52 |
| 4 | 20 | 29.08 |

Values of Conditional Expressions

Conditional Expression (1) = 1.51
Conditional Expression (2) = 0.71
Conditional Expression (3) = 0.67
Conditional Expression (4) = 0.47
Conditional Expression (5) = 2.64
Conditional Expression (6) = 48.60
Conditional Expression (7) = 40.37
Conditional Expression (8) = 48.60
Conditional Expression (9) = 50.29
Conditional Expression (10) = 43.32
Conditional Expression (11) = 0.47

Figure 21A:
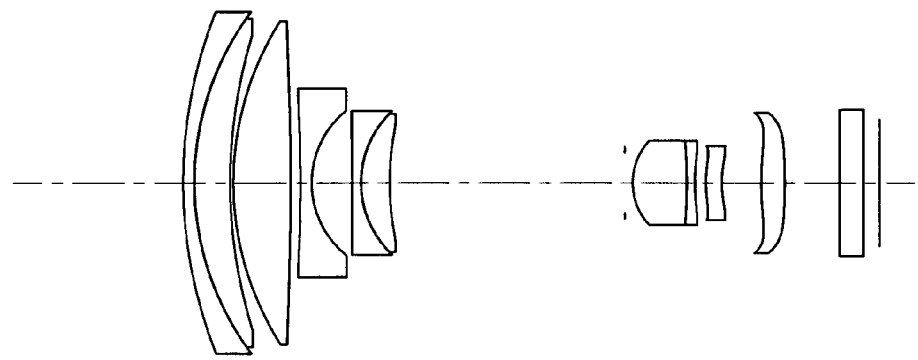
FIGS. 21A, 21B and 21C show sectional views of the zoom lens of Example 6.
Figure 21B:
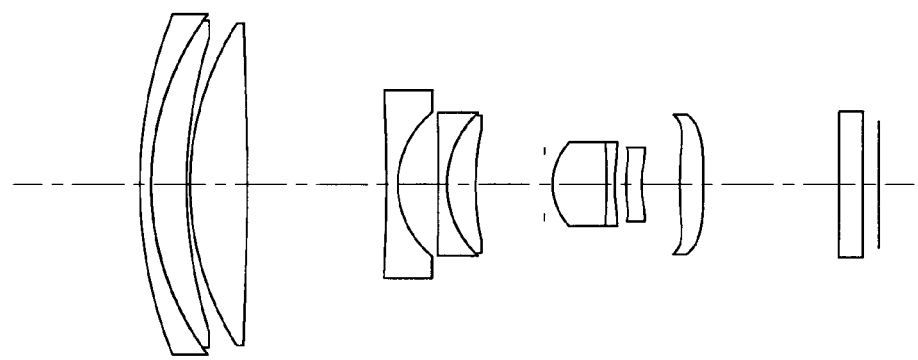
Figure 21C:
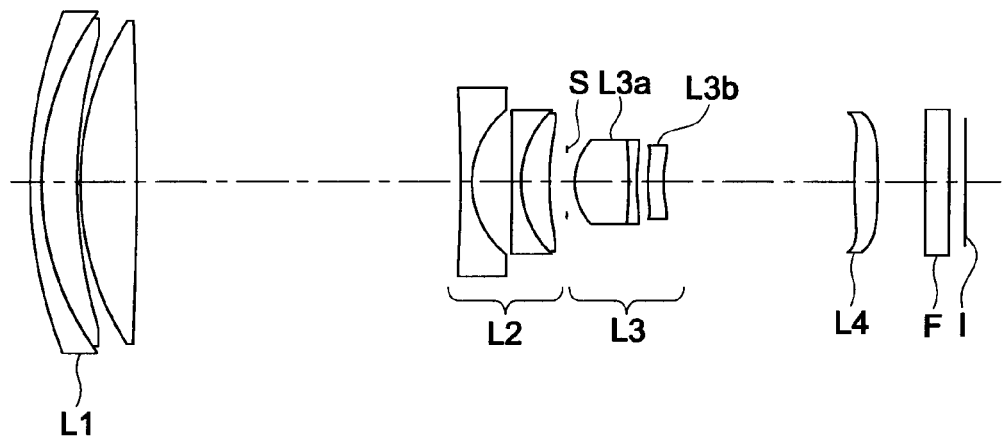

FIGS. 21A to 21C show sectional views of the zoom lens of Example 6. FIG. 21A shows the sectional view at the wide-angle end, FIG. 21B shows the sectional view at the middle focal length and FIG. 21C shows the sectional view at the telephoto end. The present zoom lens is composed of first lens group L1 with positive refractive power, second lens group L2 with negative refractive power, third lens group L3 with positive refractive power, fourth lens group L4 with positive refractive power. The first lens group L1 is composed of a negative lens, a positive lens and a positive lens. The second lens group L2 is composed of a negative lens, a negative lens and a positive lens. The third lens group L3 is composed of the 3a-th lens group L3a which is a cemented lens formed of a positive lens and a negative lens, and the 3b-th lens group L3b which is a positive lens. In FIGS. 21A to 21C, S represents an aperture stop, F represents a parallel flat plate such as an optical low-pass filter, IR-cut filter and a sealing glass of a solid-state image pickup element, and I represents an image pickup surface.

Figure 22:
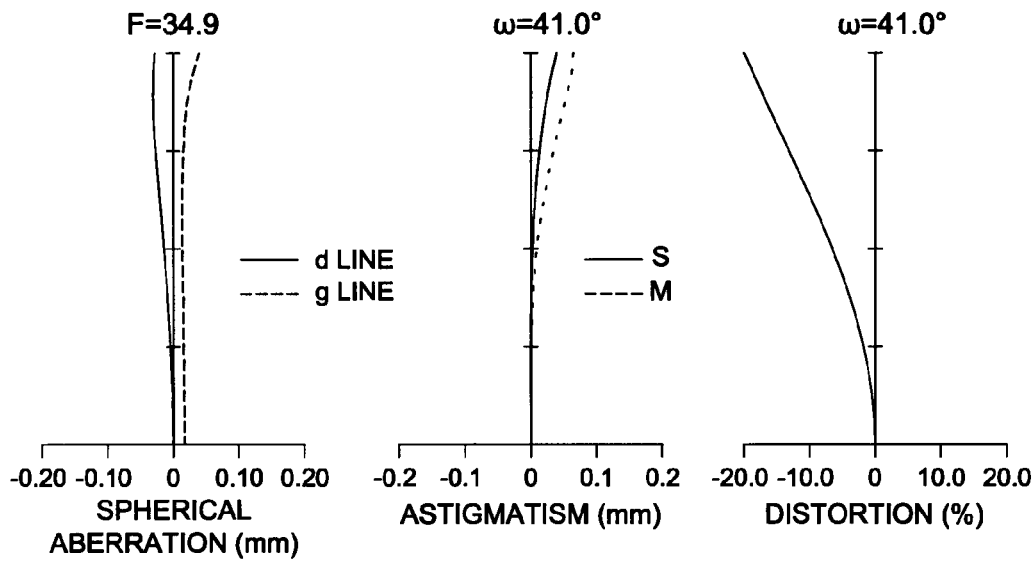
FIG. 22 shows aberration diagrams of the zoom lens of Example 6 at the wide-angle end.
Figure 23:
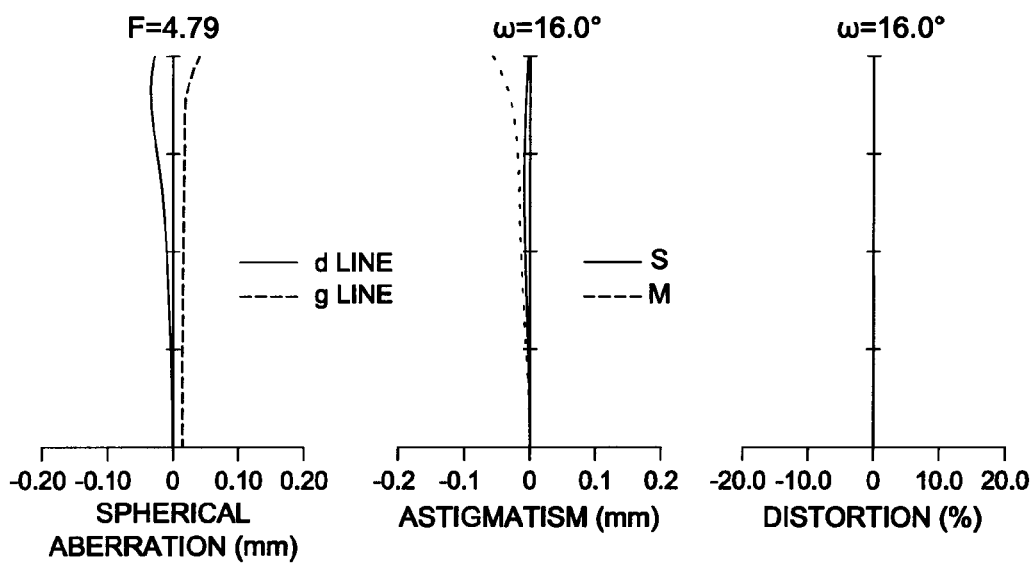
FIG. 23 shows aberration diagrams of the zoom lens of Example 6 at a middle focal length.
Figure 24:
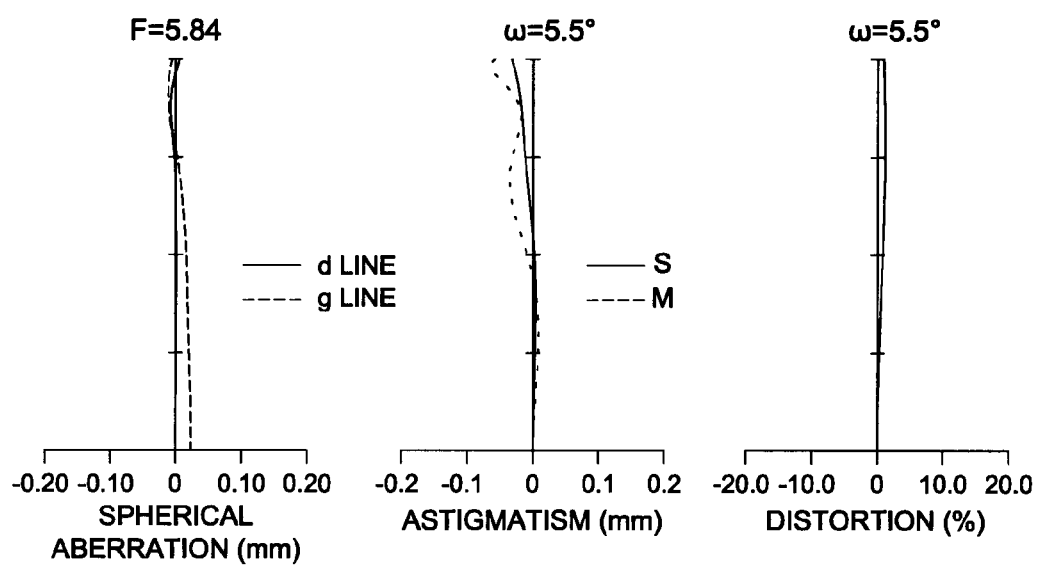
FIG. 24 shows aberration diagrams of the zoom lens of Example 6 at the telephoto end.

FIG. 22 shows aberration diagrams (spherical aberration, astigmatic aberration and distortion) of the zoom lens of Example 6 at the wide-angle end. FIG. 23 shows aberration diagrams (spherical aberration, astigmatic aberration and distortion) of the zoom lens of Example 6 at a middle focal length. FIG. 24 shows aberration diagrams (spherical aberration, astigmatic aberration and distortion) of the zoom lens of Example 6 at the telephoto end.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A zoom lens comprising, in order from an object side:
a first lens group with positive refractive power;
a second lens group with negative refractive power;
a third lens group with positive refractive power; and
a fourth lens group with positive refractive power,
wherein the zoom lens varies power by moving each lens group along the optical axis,
the first lens group consists of, in order from the object side, a negative lens and a positive lens, and
the third lens group consists of, in order from the object side, an aperture stop, a cemented lens formed by a positive lens in a biconvex shape and a negative lens, and a positive lens.

2. A zoom lens comprising, in order from an object side:
a first lens group with positive refractive power;
a second lens group with negative refractive power;
a third lens group with positive refractive power; and
a fourth lens group with positive refractive power,
wherein the zoom lens varies power by moving each lens group along the optical axis,
the third lens group consists of, in order from the object side, an aperture stop, a cemented lens formed by a positive lens and a negative lens, and a positive lens, and
the zoom lens satisfies the following conditional expression:

$$1.3 < (\beta 2t/\beta 2w)/(\beta 3t/\beta 3w) < 3.0,$$

where $\beta 2t$ is a lateral magnification at a telephoto end of the second lens group,
$\beta 2w$ is a lateral magnification at a wide-angle end of the second lens group,
$\beta 3t$ is a lateral magnification at a telephoto end of the third lens group, and
$\beta 3w$ is a lateral magnification at a wide-angle end of the third lens group.

3. The zoom lens of claim 1, satisfying the following conditional expression:

$$0.5<|f2g|/f3g<0.8,$$

where f2g is a composite focal length of the second lens group and
f3g is a composite focal length of the third lens group.

4. The zoom lens of claim 1, satisfying the following conditional expression:

$$0.55<f3g/(fw\times ft)^{1/2}<0.90,$$

where f3g is a composite focal length of the third lens group,
fw is a focal length of a whole system of the zoom lens at a wide-angle end and
ft is a focal length of a whole system of the zoom lens at a telephoto end.

5. The zoom lens of claim 1, satisfying the following conditional expression:

$$0.3<|f2g|/(fw\times ft)^{1/2}<0.6,$$

where f2g is a composite focal length of the second lens group,
fw is a focal length of a whole system of the zoom lens at a wide-angle end and
ft is a focal length of a whole system of the zoom lens at a telephoto end.

6. The zoom lens of claim 1, satisfying the following conditional expression:

$$1.0<f1g/(fw\times ft)^{1/2}<4.0,$$

where f1g is a composite focal length of the first lens group,
fw is a focal length of a whole system of the zoom lens at a wide-angle end and
ft is a focal length of a whole system of the zoom lens at a telephoto end.

7. The zoom lens of claim 1,
wherein the third lens group includes, in order from the object side: a 3 *a*-th lens group consisting of a cemented lens formed by a positive lens and a negative lens, and a 3 *b*-th lens group being a positive lens, and
the zoom lens satisfies the following conditional expression;

$$1.0<f3gb/f3ga,$$

where f3ga is a composite focal length of the 3 *a*-th lens group and
f3gb is a composite focal length of the 3 *b*-th lens group.

8. The zoom lens of claim 7, satisfying the following expression:

$$25<vd3ga1-vd3ga2<45,$$

where vd3ga1 is an Abbe number of the positive lens in the 3 *a*-th lens, and
vd3ga2 is an Abbe number of the negative lens in the 3 *a*-th lens.

9. The zoom lens of claim 1, wherein the second lens group consists of in order from the object side; a negative lens, a negative lens and a positive lens.

10. The zoom lens of claim 7,
wherein a positive lens arranged closest to an image side in the third lens group is a plastic lens and comprises an aspheric surface, and
the zoom lens satisfies the following conditional expression:

$$5.0<f3gb/f3ga<20.$$

11. The zoom lens of claim 1,
wherein the fourth lens group consists of one positive lens formed of plastic, and
at least one surface of the positive lens in the fourth lens is formed in an aspheric shape.

12. The zoom lens of claim 1,
wherein the first lens group comprises a surface formed in an aspheric shape.

13. The zoom lens of claim 1, satisfying the following expression:

$$40<vd1g2-vd1g1,$$

where vd1g1 is an Abbe number of the negative lens in the first lens group, and
vd1g2 is an Abbe number of the positive lens in the first lens group.

14. The zoom lens of claim 9,
wherein a negative lens arranged second closest to the object side and a positive lens arranged closest to the image side in the second lens group satisfy the following conditional expression:

$$20<vd2g2-vd3g2$$

where vd2g2 is an Abbe number of the negative lens arranged second closest to the object side in the second lens group, and
vd3g2 is an Abbe number of the positive lens closest to the image side in the second lens group.

15. The zoom lens of claim 1, satisfying the following conditional expression:

$$0.38<|f2g|/(fw\times ft)^{1/2}<0.53,$$

where f2g is a composite focal length of the second lens group,
fw is a focal length of a whole system of the zoom lens at a wide-angle end and
ft is a focal length of a whole system of the zoom lens at a telephoto end.

16. The zoom lens of claim 1, satisfying the following conditional expression:

$$2.0<f1g/(fw\times ft)^{1/2}<2.7,$$

where f1g is a composite focal length of the first lens group,
fw is a focal length of a whole system of the zoom lens at a wide-angle end and
ft is a focal length of a whole system of the zoom lens at a telephoto end.

17. The zoom lens of claim 2, satisfying the following conditional expression:

$$0.5<|f21|/f3g<0.8,$$

where f2g is a composite focal length of the second lens group and
f3g is a composite focal length of the third lens group.

18. The zoom lens of claim 2, satisfying the following conditional expression:

$$0.55<f3g/(fw\times ft)^{1/2}<0.90,$$

where f3g is a composite focal length of the third lens group,
fw is a focal length of a whole system of the zoom lens at a wide-angle end and
ft is a focal length of a whole system of the zoom lens at a telephoto end.

19. The zoom lens of claim 2, satisfying the following conditional expression:

$$0.3<|f2g|/(fw\times ft)^{1/2}<0.6,$$

where f2g is a composite focal length of the second lens group, fw is a focal length of a whole system of the zoom lens at a wide-angle end and ft is a focal length of a whole system of the zoom lens at a telephoto end.

20. The zoom lens of claim 2, satisfying the following conditional expression:

$$1.0 < f1g/(fw \times ft)^{1/2} < 4.0,$$

where f1g is a composite focal length of the first lens group, fw is a focal length of a whole system of the zoom lens at a wide-angle end and ft is a focal length of a whole system of the zoom lens at a telephoto end.

21. The zoom lens of claim 2,
wherein the third lens group includes, in order from the object side: a 3 *a*-th lens group consisting of a cemented lens formed by a positive lens and a negative lens, and a 3 *b*-th lens group being a positive lens,
the zoom lens satisfies the following conditional expression;

$$1.0 < f3gb/f3ga,$$

where f3ga is a composite focal length of the 3 *a*-th lens group and f3gb is a composite focal length of the 3 *b*-th lens group.

22. The zoom lens of claim 21, satisfying the following expression:

$$25 < vd3ga1 - vd3ga2 < 45,$$

where vd3ga1 is an Abbe number of the positive lens in the 3 *a*-th lens, and vd3ga2 is an Abbe number of the negative lens in the 3 *a*-th lens.

23. The zoom lens of claim 2,
wherein the second lens group consists of; in order from the object side; a negative lens, a negative lens and a positive lens.

24. The zoom lens of claim 21,
wherein a positive lens arranged closest to an image side in the third lens group is a plastic lens, comprises an aspheric surface, and
the zoom lens satisfies the following conditional expression:

$$5.0 < f3gb/f3ga < 20.$$

25. The zoom lens of claim 2,
wherein the fourth lens group consists of one positive lens formed of plastic, and
at least one surface of the positive lens in the fourth lens is formed in an aspheric shape.

26. The zoom lens of claim 2,
wherein the first lens group comprises a surface formed in an aspheric shape.

27. The zoom lens of claim 2,
wherein the first lens group comprises, in order from the object side, a negative lens and a positive lens, and
the zoom lens satisfies the following expression:

$$40 < vd1g2 - vd1g1,$$

where vd1g1 is an Abbe number of the negative lens in the first lens group, and vd1g2 is an Abbe number of the positive lens in the first lens group.

28. The zoom lens of claim 23,
wherein a negative lens arranged second closest to the object side and a positive lens arranged closest to the image side in the second lens group satisfy the following conditional expression:

$$20 < vd2g2 - vd3g2,$$

where vd2g2 is an Abbe number of the negative lens arranged second closest to the object side in the second lens group, and vd3g2 is an Abbe number of the positive lens closest to the image side in the second lens group.

29. The zoom lens of claim 2, satisfying the following conditional expression:

$$0.38 < |f2g|/(fw \times ft)^{1/2} < 0.53,$$

where f2g is a composite focal length of the second lens group, fw is a focal length of a whole system of the zoom lens at a wide-angle end and ft is a focal length of a whole system of the zoom lens at a telephoto end.

30. The zoom lens of claim 2, satisfying the following conditional expression:

$$2.0 < f1g/(fw \times ft)^{1/2} < 2.7,$$

where f1g is a composite focal length of the first lens group, fw is a focal length of a whole system of the zoom lens at a wide-angle end and ft is a focal length of a whole system of the zoom lens at a telephoto end.

* * * * *